(12) United States Patent
Shimojoh et al.

(10) Patent No.: US 6,882,466 B1
(45) Date of Patent: Apr. 19, 2005

(54) OPTICAL AMPLIFIER

(75) Inventors: Naomasa Shimojoh, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/634,912

(22) Filed: Aug. 9, 2000

(30) Foreign Application Priority Data

Sep. 28, 1999 (JP) .......................... 11-275012

(51) Int. Cl.$^7$ .............................................. H01S 3/00
(52) U.S. Cl. .............. 359/334; 359/341.33; 359/337.1; 359/349; 359/341.31
(58) Field of Search ........................... 359/349, 341.32, 359/333, 334, 341.5, 337.5, 341.1, 341.33, 337.1

(56) References Cited

U.S. PATENT DOCUMENTS

| | | | |
|---|---|---|---|
| 5,323,404 A | * 6/1994 | Grubb | 372/6 |
| 5,563,733 A | * 10/1996 | Mitsuda et al. | 359/341 |
| 5,675,432 A | 10/1997 | Kosaka | 359/337.13 |
| 5,801,858 A | * 9/1998 | Roberts et al. | 606/167 |
| 5,986,800 A | 11/1999 | Kosaka | 359/341.41 |
| 6,081,366 A | * 6/2000 | Kidorf et al. | 359/334 |
| 6,094,296 A | 7/2000 | Kosaka | 359/341.41 |
| 6,151,160 A | * 11/2000 | Ma et al. | 359/341 |

(Continued)

FOREIGN PATENT DOCUMENTS

| | | | |
|---|---|---|---|
| EP | 0734105 A2 | 9/1996 | H01S/3/06 |
| EP | 0883218 A1 | 12/1998 | H01S/3/06 |
| JP | 8-278523 | 10/1996 | G02F/1/35 |
| JP | 9-179152 | 7/1997 | G02F/1/35 |
| JP | 10-229238 | 8/1998 | H01S/3/10 |
| JP | 11-145538 | 5/1999 | H01S/3/10 |
| WO | WO98/42088 | 9/1998 | H04B/10/17 |

OTHER PUBLICATIONS

Kawai et al. OFC/IOOC '99 Tech. Digest. Feb. 21–26, 1999 vol. 4.*

(Continued)

*Primary Examiner*—Mark Hellner
*Assistant Examiner*—Stephen Cunningham
(74) *Attorney, Agent, or Firm*—Staas & Halsey LLP

(57) ABSTRACT

An optical amplifier is provided for performing amplification of optical signals of two wavelength bands, where deterioration in the optical SN ratio relative to one wavelength band is reduced, with a simple construction which can deal with restrictions on installation space, power consumption and the like. To this end, the present optical amplifier has a C/L band optical amplifying section for amplifying respective optical signals of a C band and an L band, a demultiplexer for demultiplexing output light from the C/L band optical amplifying section into the C band and the L band, an L band optical amplifying section for amplifying L band optical signals which have been demultiplexed by the demultiplexer, and a multiplexer for multiplexing the C band optical signals which have been demultiplexed by the demultiplexer and the L band optical signals which have been amplified by the L band optical amplifying section. The construction is such that a part of excitation light of a 1480 nm band used in the C/L band optical amplifying section is supplied via an input terminal to a Raman amplification producing medium of a transmission path, and Raman amplified L band optical signals are input to the C/L band optical amplifying section.

31 Claims, 18 Drawing Sheets

U.S. PATENT DOCUMENTS

| | | | |
|---|---|---|---|
| 6,229,641 B1 * | 5/2001 | Kosaka | 359/337 |
| 6,236,496 B1 | 5/2001 | Yamada et al. | 359/341.33 |
| 6,256,141 B1 | 7/2001 | Kosaka | 359/337.13 |
| 6,304,368 B1 * | 10/2001 | Hansen et al. | 359/134 |
| 6,342,965 B1 | 1/2002 | Kinoshita | 359/334 |
| 6,373,622 B1 | 4/2002 | Kosaka | 359/337.13 |
| 6,462,862 B1 | 10/2002 | Kinoshita | 359/334 |
| 6,525,871 B1 | 2/2003 | Kosaka | 359/337.13 |
| 6,587,241 B1 * | 7/2003 | Saleh | 398/92 |
| 2002/0008901 A1 | 1/2002 | Kinoshita | 359/341.1 |
| 2002/0024724 A1 | 2/2002 | Kosaka | 359/337 |
| 2002/0109909 A1 | 8/2002 | Kinoshita | 359/341.1 |
| 2002/0141042 A1 | 10/2002 | Kosaka | 359/337.13 |
| 2003/0142391 A1 | 7/2003 | Kosaka | 359/337.1 |

OTHER PUBLICATIONS

Masuda et al. IOOC and ECOC '97 Sep. 22–25, 1997. vol. 5.*

Masuda et al. Elec. Letts. Apr. 24, 1997 vol. 33 No. 9.*

Masuda et al. Elec. Letts. Jun. 25, 1998 vol. 34 No. 13.*

Masuda et al. ECOC '98. Sep. 20–24, 1998.*

Masuda. OFCC '2000. Mar. 7–10, 2000 vol. 1.*

Antos et al. Journal of Lightwave Tech. vol. 12, No. 10, Oct. 1994.*

Nielsen et al. OFCC, 2000 vol. 4, Mar. 7–10, 2000.*

Kinoshita et al. OAA '98 Tech. Digest, Jul. 1998.*

Watanabe, Shigeki; Naito, Takao; and Chikama, Terumi. "Compensation of Chromatic Dispersion in an Single–Mode Fiber by Optical Phase Conjugation." IEEE, Photonics Technology Letters. vol. 5, No. 1, Jan. 1993.*

M. Yamada, et al. "Recent Progress in Broadband and Gain–Flattened Optical Fiber Amplifiers", Technical Report of IEICE, OCS97–42, ED97–132, OPE97–87, LQU97–87 (Nov. 1997).

Yan Sun et al., "Optical Fiber Amplifiers for WDM Optical Networks", Bell Labs Technical Journal, vol. 4, No. 1.

Yan Sun et al., "Ultra Wide Band Erbium–Doped Silica Fiber Amplifier with 80 nm of Bandwidth", Optical Amplifiers and Their Applications.

JPO Transcript of Decision of Final Rejection. Application #H11–275012 dated Mar. 8, 2003.*

JPO Notice of Reasons for Rejection. Application #H11–275012 dated Mar. 8, 2003.*

EPO Search Report. Application #00116297 dated Dec. 20, 2003.*

Sugaya et al., "In–Service–Upgradable and Wide–Dynamic–Range Split–Band Optical Fibre Amplifier for High–Capacity Broadband WDM Transmission Systems", Electronics Letters, Aug. 5, 1999, vol. 35, No. 16, pp. 1361–1362.

Kinoshita, "Advances in Optical Fiber Amplifiers for WDM Systems", 5th Asia Pacific Conference on Communications, APCC/OECC'99, Proceedings. Conference–Vitality to the New Century and Optoelectronics and Communications Conference, (IEEE Cat. No. 99EX379), Porceedings of APCC/OECC'99–5th Asia Pacific Conference, pp. 1333–1334.

* cited by examiner

OPTICAL AMPLIFIER

BACKGROUND OF THE INVENTION (1) Field of the Invention

The present invention relates to an optical amplifier for amplifying wavelength division multiplexed signal light. In particular the invention relates to an optical amplifier for collectively amplifying wavelength division multiplexed signal light which includes optical signals of two wavelength bands.

(2) Description of the Related Art

With conventional long distance light transmission systems, light transmission is performed using light regeneration repeaters which convert optical signals into electric signals to effect re-timing, re-shaping, and regenerating. However recently, with progress in the utilization of optical amplifiers, optical amplifier repeater transmission systems which use optical amplifiers as linear repeaters are being investigated. By replacing a light regeneration repeater with an optical amplifier repeater, the number of parts in the repeater can be greatly reduced, with the prospect of maintaining reliability and greatly reducing costs.

Furthermore, as one method of realizing a large capacity of an optical transmission system, a wavelength division multiplexed (WDM) light transmission system which multiplexes and transmits two or more optical signals having different wavelengths on a single optical transmission path is attracting attention. In a WDM optical amplifier repeater transmission system with the abovementioned optical amplifier repeater transmission system combined with a WDM light transmission system, it is possible to collectively amplify, WDM signal light using an optical amplifier, thus enabling the realization of large capacity and long distance transmission with a simple (economic) construction.

For the wavelength band of the WDM signal light used in the abovementioned conventional optical transmission system, in addition to a so called C band of a 1550 nm band, recently a so called L band of a 1580 nm band is being investigated. Moreover, a WDM optical amplifier repeater transmission system where both are transmitted on a single transmission line (a C/L band WDM optical amplifier repeater transmission system) is being investigated.

As an optical amplifier having an optical amplification band in both the C band and the L band, there is known for example an article "Recent Research Progress in Broadband Optical Fiber Amplifiers" by Yamada et al, Technical Report of IEICE. OCS 97-42, ED 97-132 OPE 97-87 LQE 97-87 (1997-11). The present optical amplifier, as shown in FIG. 23 is of a simple parallel construction where an input WDM signal light is demultiplexed by a demultiplexer into a C band and an L band, and after being respectively amplified in a C band optical amplifying section and an L band optical amplifying section, is multiplexed by a multiplexer and then output However, since the demultiplexer is provided on the input side of the respective C band and the L band optical amplifying sections, there is a problem that the noise figure deteriorates by the insertion loss portion. As a technique for coping with this, there is known for example an optical amplifier disclosed for example in "Optical Amplifiers and their Applications, Post deadline 2 of '97 published by Lucent Technologies. A schematic construction of this is shown in the block diagram of FIG. 24. With the construction of FIG. 24, a C/L band optical amplifying section having an amplifying band in both the C band and the L band is arranged in the pre-stage of the demultiplexer in the construction of FIG. 23. Hence at least a gain equal to or greater than the insertion loss part of the demultiplexer is ensured by the C/L band optical amplifying section, so that an improvement in the noise figure is achieved.

However, with the above mentioned C/L band optical amplifier, there is the drawback in that there are many cases where the noise figure for the C band optical amplifying section and the noise figure for the L band optical amplifying section are different, so that in general, the optical SN ratio for the optical signal of the L band deteriorates compared to that for the optical signal of the C band. More specifically, in the case where an optical fiber amplifier which uses rare earth element doped fiber is employed in the optical amplifying sections of the respective bands, it is known that the noise figure for the L band optical amplifying section deteriorates by 1 dB.

Furthermore, with the optical amplifier of the construction as shown in FIG. 24, since this has three or more optical fiber amplifier sections, the number of excitation light sources also increases. As a result, the power consumption of the overall optical amplifier increases. In particular, in the case where, as with optical amplifiers used for example as undersea repeaters or the like, there are restrictions from the view point of installation space, power consumption or other factors, it is difficult to realize a construction such as shown in FIG. 24.

Furthermore, It is also important to control the balance of the optical power of the C band and the L band. That is to say, in the case of a setting where the number of optical signals (channel number) included in the respective bands is different, or in the case where this setting is changed during operation, it is necessary to appropriately control the respective operations of the optical amplifying sections for the respective bands to ensure the required transmission characteristics.

SUMMARY OF THE INVENTION

The present invention focuses on the above points, with a first object of providing an optical amplifier for performing amplification of optical signals of two wavelength bands, wherein deterioration in the relative optical SN ratio for one wavelength band is reduced. Moreover, a second object is to provide an optical amplifier of a simple construction which can deal with restrictions on installation space, power consumption and the like. Furthermore, a third object is to provide an optical amplifier enabling the balance control of the optical power with respect to respective wavelength bands is possible.

In order to achieve the abovementioned objects, a first aspect of an optical amplifier according to the present invention for amplifying wavelength division multiplexed signal light which contains respective optical signals of a first wavelength band (for example 1550 nm band etc.) and a second wavelength band (for example 1580 nm band etc.), comprises an optical amplifying device for amplifying the wavelength division multiplexed signal light using a rare earth element doped fiber to which excitation light is supplied, wherein the excitation light used by the optical amplifying device has a wavelength capable of producing Raman amplification with respect to optical signals of the second wavelength band, and by supplying a part of the excitation light used in the optical amplifying device to a Raman amplification producing medium which forms at least a part of an external transmission path arranged on a pre-stage side of the optical amplifying device, wavelength division multiplexed signal light which contains optical signals of the second wavelength band which have been Raman amplified by the Raman amplification producing medium, are input to the optical amplifying device.

With such a construction, the optical signals of the second wavelength band can be Raman amplified, by employing a part of the excitation light used in the optical amplifying device. Hence the optical signals of the second wavelength band which have been Raman amplified are amplified by the optical amplifying device. As a result, the optical SN ratio for the second wavelength band is improved, and optical signals with uniform characteristics in the respective wavelength bands can be obtained.

As one specific construction for the above mentioned optical amplifier, there may be provided a demultiplexing device for demultiplexing the wavelength division multiplexed signal light into respective optical signals of a first wavelength band and a second wavelength band, and a multiplexing device for multiplexing respective optical signals of the first wavelength band and the second wavelength band which have been demultiplexed by the demultiplexing device, and the optical amplifying device may have a first amplifying section for amplifying optical signals of the first wavelength band which have been demultiplexed by the demultiplexing device, and a second amplifying section for amplifying optical signals of the second wavelength band which have been demultiplexed by the demultiplexing device, the construction being such that by supplying via the demultiplexing device a part of the excitation light used in the first amplifying section to the Raman amplification producing medium, optical signals of the second wavelength band which have been Raman amplified by the Raman amplification producing medium, are input via the demultiplexing device to the second optical amplifying section.

Furthermore, as another specific construction for the abovementioned optical amplifier, there may be provided a demultiplexing device for demultiplexing the wavelength division multiplexed signal light into respective optical signals of a first wavelength band and a second wavelength band, and a multiplexing device for multiplexing respective optical signals of the first wavelength band and the second wavelength band which have been demultiplexed by the demultiplexing device, and the optical amplifying device may have a pre-stage amplifying section for collectively amplifying the wavelength division multiplexed signal light input to the demultiplexing device, and a second optical amplifying section for amplifying only optical signals of the second wavelength band which have been demultiplexed by the demultiplexing device, the construction being such that by supplying a part of the excitation light used in the pre-stage optical amplifying section to the Raman amplification producing medium, wavelength division multiplexed signal light which contains optical signals of the second wavelength band which have been Raman amplified by the Raman amplification producing medium are input to the pre-stage optical amplifying section.

Another aspect of an optical amplifier according to the present invention for amplifying wavelength division multiplexed signal light which contains respective optical signals of a first wavelength band (for example a 1550 nm band etc.) and a second wavelength band (for example a 1580 nm band etc.) may comprise a pre-stage optical amplifying device for collectively amplifying respective optical signals of the first wavelength band and the second wavelength band for the wavelength division multiplexed signal light, a demultiplexing device for demultiplexing the wavelength division multiplexed signal light which has been amplified by the pre-stage amplifying device into optical signals of a first wavelength band and optical signals of a second wavelength band, a post-stage optical amplifying device for amplifying only optical signals of the second wavelength band which have been demultiplexed by the demultiplexing device, and a multiplexing device for multiplexing optical signals of the first wavelength band which have been demultiplexed by the demultiplexing device, and optical signals of the second wavelength band which have been amplified by the post-stage optical amplifying device.

With such a construction, in the pre-stage optical amplifying device provided at the input stage, the optical signals of the first wavelength band are amplified to a sufficient level, while for the optical signals of the second wavelength band, the insufficient gain portion is amplified by the post-stage optical amplifying device. As a result, the construction can be simplified compared to the conventional optical amplifier.

Furthermore, the abovementioned optical amplifier is preferably constructed to comprise a first power monitor device for monitoring the optical signal power of the first wavelength band which has been demultiplexed by the demultiplexing device, a second power monitor device for monitoring the optical signal power of the second wavelength band which has been amplified by the post-stage optical amplifying device, and an optical power deviation control device for controlling the operation of at least one of the pre-stage optical amplifying device and the post-stage optical amplifying device in response to the respective monitor results of the first and second power monitor devices, so that the optical power deviation for the first and the second wavelength bands becomes constant.

With such a construction, balance control of the optical power of the first wavelength band and the second wavelength band is performed. As a result, the optical amplification for the respective wavelength bands can be more stably performed. Moreover, it is possible to flexibly correspond to changes in the channels being used.

By combining the two aspects of the optical amplifier according to the present invention as described above, that is to say, by Raman amplifying the optical signals of the second wavelength band using a part of the excitation light used in the optical amplifying device, and omitting the first optical amplifying section for amplifying the demultiplexed optical signals of the first wavelength band, the construction can be simplified. Moreover, a construction is also possible where balance control for the respective wavelength bands is performed.

Other objects, features and advantages of the present invention will become apparent from the following description of embodiments given in conjunction with the appended drawings.

EMBODIMENTS OF THE INVENTION

Hereunder is a description of embodiments of the present invention based on the drawings.

Figure 1:
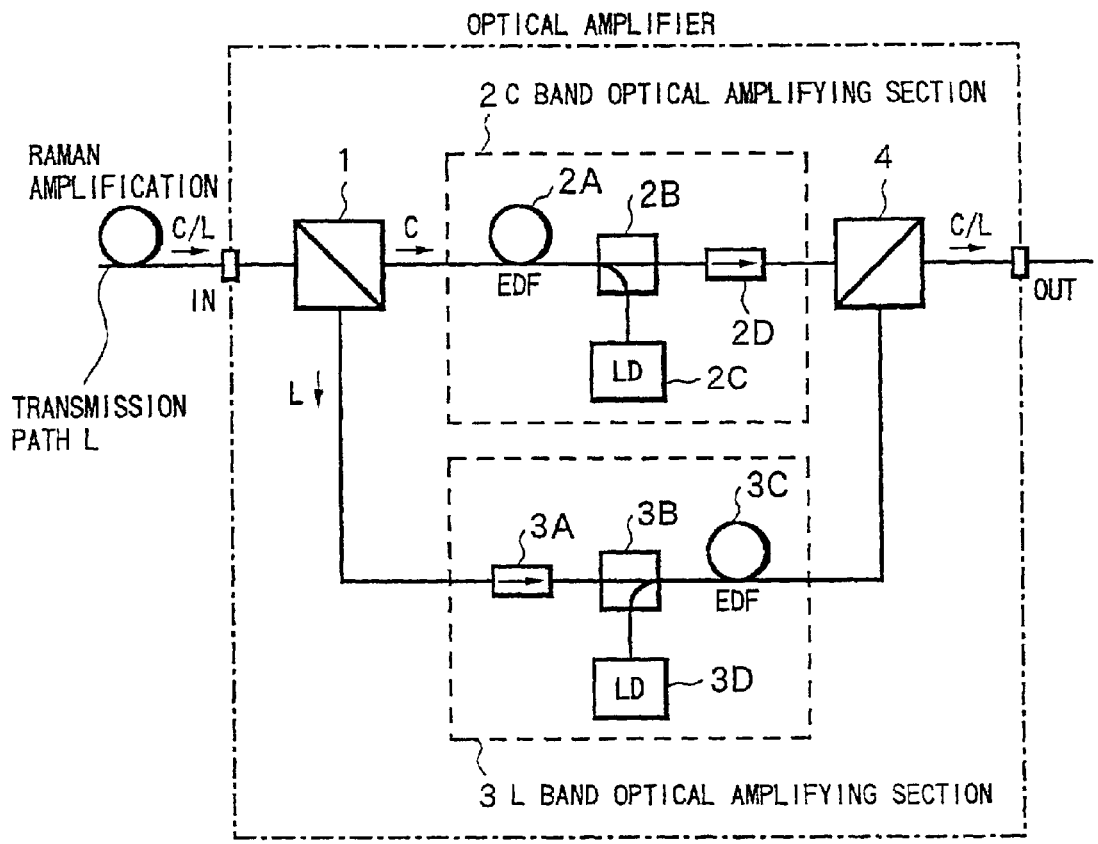
FIG. 1 is a block diagram showing a basic construction of an optical amplifier according to a first embodiment of the present invention.

FIG. 1 is a block diagram showing a basic construction of an optical amplifier according to a first embodiment.

In FIG. 1, the present optical amplifier has a demultiplexer 1 serving as a demultiplexing device for demultiplexing WDM signal light input from an external transmission path L via a terminal IN, into a C band optical signal and an L band optical signal, a C band optical amplifying section 2 serving as a first optical amplifying section for amplifying the C band optical signals which have been demultiplexed by the demultiplexer 1, an L band optical amplifying section 3 serving as a second optical amplifying section for amplifying the L band optical signals which have been demultiplexed by the demultiplexer 1, and a multiplexer 4 serving as a multiplexing device for multiplexing optical signals which have been respectively amplified by the C band optical amplifying section 2 and the L band optical amplifying section 3, and outputting these to the outside via a terminal OUT.

Here, the C band corresponds to a first wavelength band. More specifically, this represents a wavelength band (1550 nm band) for example from 1525 to 1565 nm. Furthermore, the L band corresponds to a second wavelength band. More specifically, this represents a wavelength band (1580 nm band) for example from 1565 to 1610 nm. However, the first and second wavelength bands applicable to the present invention, are not limited to the above mentioned range.

The C band optical amplifying section 2 includes for example an erbium doped fiber (hereunder EDF) 2A, a WDM coupler 2B, an excitation light source (LD) 2C, and an optical isolator 2D.

The EDF 2A is a known rare earth doped fiber with erbium (Er) doped into an optical fiber. The length etc. thereof is optimized so as to have an amplifying band at least for the C band. The specific setting of this EDF 2A is described later. The WDM coupler 2B is an optical coupler for supplying excitation light generated by the excitation light source 2C, to the EDF 2A from a rear side. The excitation light source 2C is a typical light source which generates excitation light of a wavelength band (for example 1480 nm band etc.) which can excite the erbium inside the EDF 2A, and which can produce Raman amplification inside the external transmission path L with respect to L band optical signals. The optical isolator 2D is a typical optical component which passes light only in a direction from the WDM coupler 2B towards the multiplexer 4.

The L band optical amplifying section 3 comprises for example an optical isolator 3A, a WDM coupler 3B, an EDF 3C, and an excitation light source (LD) 3D.

The optical isolator 3A only passes light in a direction from the demultiplexer 1 towards the WDM coupler 3B. The WDM coupler 3B is an optical coupler which couples L band optical signals which have passed through the optical isolator 3A with excitation light generated by the excitation light source 3D, and supplies this to the EDF 3C. The EDF 3C is a known rare earth doped fiber with erbium doped into an optical fiber. The length etc. thereof is optimized so as to have an amplifying band only for the L band. The specific setting of this EDF 3C is also described later. The excitation light source 3D is a typical light source which generates excitation light of a wavelength band (for example the 980 nm band or the 1480 band etc.) which can excite the erbium inside the EDF 3C.

In the case where L band optical amplification is performed using the EDF, in consideration of the influence of the generation of spontaneous emission (ASE) light, in general this is made a forward excitation type construction. However, there is also the case where excitation light is also supplied from the rear side of the EDF, that is to say this is made a bidirection excitation type, to achieve an improvement in excitation efficiency.

Furthermore, with the external transmission path L connected to the present optical amplifier, an optical fiber designed with the non-linear effective cross section reduced compared to a 1.3 $\mu$m zero dispersion single mode fiber (SMF) generally used as an optical transmission path, so that the production of Raman amplification is facilitated, is used at least on the side connected to the terminal IN of the optical amplifier.

Figure 2:
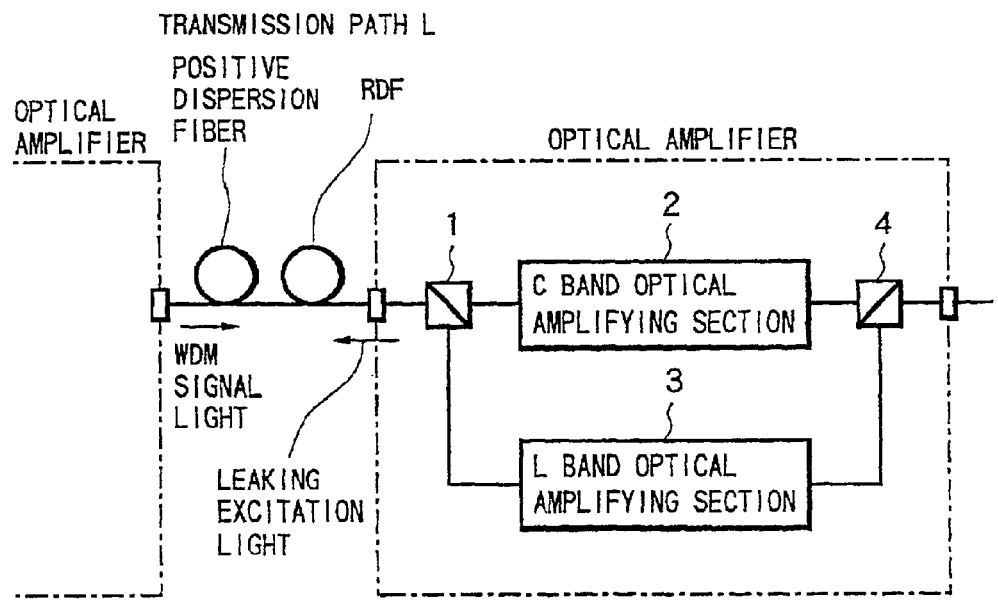
FIG. 2 is a diagram showing an example of a transmission path used in the above mentioned first embodiment.

More specifically, for example as shown in FIG. 2, it is suitable to employ a hybrid transmission path which uses a positive dispersion fiber (for example a 1.3 µm zero dispersion SMF etc.) with a relatively large non-linear effective cross section having a positive wavelength dispersion value and a positive dispersion slope with respect to the signal light wavelength band, in a first half of a repeater section (the output side of the optical amplifier), and a negative dispersion fiber RDF with a relatively small non-linear effective cross section having a negative wavelength dispersion value and a negative dispersion slope, in a last half of the repeater section (the input side of the optical amplifier). By applying this hybrid transmission path, the excitation light of 1480 nm which has leaked out from the input terminal of the optical amplifier is supplied to the RDF, so that effectively, Raman amplification is produced with respect to the L band optical signal. Furthermore, concurrent with this, the wavelength dispersion and dispersion slope produced by the first half 1.3 µm zero dispersion SMF are compensated for by the last half RDF. The technique for transmitting WDM signal light using such a hybrid transmission path has been previously proposed by the present applicant (refer to Japanese Patent Application No. 11-58499, and Japanese Patent Application No. 11-104158).

The transmission path L connected to the optical amplifier according to the present invention is not limited to a hybrid transmission path such as described above, and may be one where an optical fiber with a non-linear effective cross section which is smaller than a 1.3 µm zero dispersion SMF, is used over the entire region of the repeater section. Moreover, as an optical fiber with a small non-linear effective cross section, other than the above mentioned RDF, for example a dispersion shifted fiber (DSF) or the like may be used.

Here is a description concerning the setting conditions for an EDF having an amplifying band in the above mentioned C band or L band.

Figure 3:
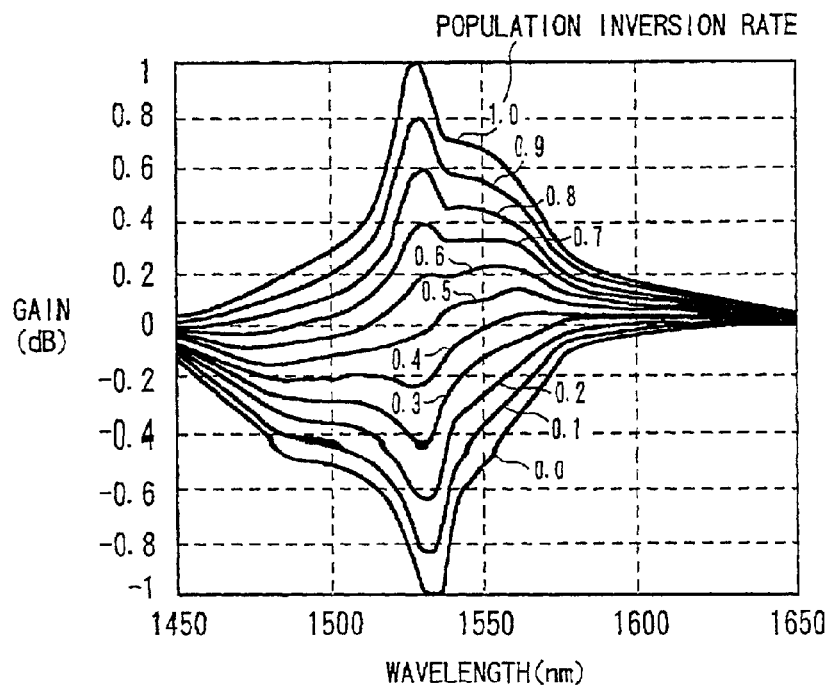
FIG. 3 is a diagram with wavelength characteristics related to gain per unit length of a typical EDF shown for each population inversion rate.

FIG. 3 is a diagram with wavelength characteristics related to gain per unit length of a typical EDF shown for each population inversion rate (0.0~1.0).

As shown in FIG. 3, for the C band (1550 nm band), this has a positive gain when the population inversion rate is approximately 0.55 or more. For the L band (1580 nm band), this has a positive gain when the population inversion rate is approximately 0.4 or more, however, if the population inversion rate increases, the wavelength dependency of the gain increases. For the L band, the population inversion rate where a comparatively flat gain wavelength characteristic can be obtained is around a range of 0.45~0.55.

Consequently, with the C band optical amplification, the length and excitation optical power of the EDF 2A is set so that the average population inversion rate in the longitudinal direction of the EDF 2A is 0.55 or more. By so doing, the C band optical signal can be amplified up to a required level. In the case of this setting, although the L band optical signal can also be amplified, the gain thereof is smaller than the gain of the C band with the characteristic that the gain deviation with respective to wavelength is also large. On the other hand, with the L band optical amplification, the length and excitation optical power of the EDF 3C is set so that the average population inversion rate in the longitudinal direction of the EDF 3C is in the range of 0.45~0.55. By so doing, only the L band optical signal can be amplified at a flat gain wavelength characteristic. The L band optical amplification with such a low population inversion rate can be realized, with a method such as where the typical EDF used in the C band optical amplification is lengthened and the population inversion rate reduced.

Here is a brief description concerning the above mentioned Raman amplification.

Raman amplification is a phenomenon where, by supplying a required excitation light to a Raman amplification producing medium, an optical signal propagated inside the Raman amplification producing medium is amplified. The wavelength band where Raman amplification is produced is known to change in accordance with the wavelength band of the Raman excitation light. More specifically, with a wavelength band used for optical communication, it can be considered that Raman amplification is produced in a wavelength band shifted from a Raman excitation light wavelength by approximately 100 nm to the long wavelength side. Furthermore, Raman amplification has the characteristic of being easily produced in an optical fiber where the non-linear effective cross section is small. Consequently, with the construction shown in FIG. 1, in the C band optical amplifying section 2, Raman amplification is produced with respect to optical signals of the L band (1580 nm band) inside the small non-linear effective cross section RDF of the transmission path L to which the excitation light of the wavelength 1480 nm band output from the excitation light source 2C is supplied.

Next is a description of the operation of the optical amplifier of the first embodiment.

With the present optical amplifier, due to the excitation light of the 1480 nm band leaked out to the transmission path L from the C band optical amplifying section 2 via the demultiplexer 1 and the terminal IN, Raman amplification is produced in the transmission path L with respect to the L band optical signal, and the WDM signal light which contains the L band optical signals which have been Raman amplified, is input to the demultiplexer 1 via the terminal IN.

In the demultiplexer 1, the input WDM signal light is demultiplexed for each of the respective bands, and the C band optical signal is sent to the C band amplifying section 2, and the L band optical signal is sent to the L band optical amplifying section 3. In the C band optical amplifying section 2, the optical signal from the demultiplexer 1 is sent to the EDF 2A The excitation light from the excitation light source 2C is supplied to the EDF 2A via the WDM coupler 2B to give the excited condition of the EDF 2k Then, the C band optical signal is propagated inside the EDF 2A and amplified to a required level by the induced emission. The amplified C band optical signals are then sent to the multiplexer 4 via the WDM coupler 2B and the optical isolator 2D.

In the L band optical amplifying section 3, the Raman amplified L band optical signal which has been sent from the demultiplexer 1, is sent to the EDF 3C via the optical isolator 3A and the WDM coupler 3B. The excitation light of the wavelength 1480 nm band from the excitation light source 3D is supplied to the EDF 3C via the WDM coupler 3B to give the excited condition of the EDF 3C. Then, the L band optical signal is propagated inside the EDF 3C and amplified to a required level by the induced emission.

Optical signals of each band which have been respectively amplified by the C band optical amplifying section 2 and the L band optical amplifying section 3 are sent to the multiplexer 4 to be multiplexed, and then output to the outside of the present amplifier via the terminal OUT.

With the first embodiment as described above, the construction is such that the excitation light of the 1480 nm band supplied to the EDF 2A in the C band optical amplifying section 2 is leaked out to the external transmission path L via the demultiplexer 1 and the terminal IN, and by using a part of the excitation light to the EDF 2A to produce Raman amplification in the transmission path L, the optical signal level of the L band which is contained in the WDM signal light input to the present optical amplifier, increases. Therefore, the optical SN ratio of the L band optical signal output from the L band optical amplifying section 3 can be improved. As a result, the optical SN ratio where heretofore the L band is deteriorated compared to the C band, can be given approximately the same characteristics by using Raman amplification.

Next is a description of a second embodiment of the present invention.

Figure 4:
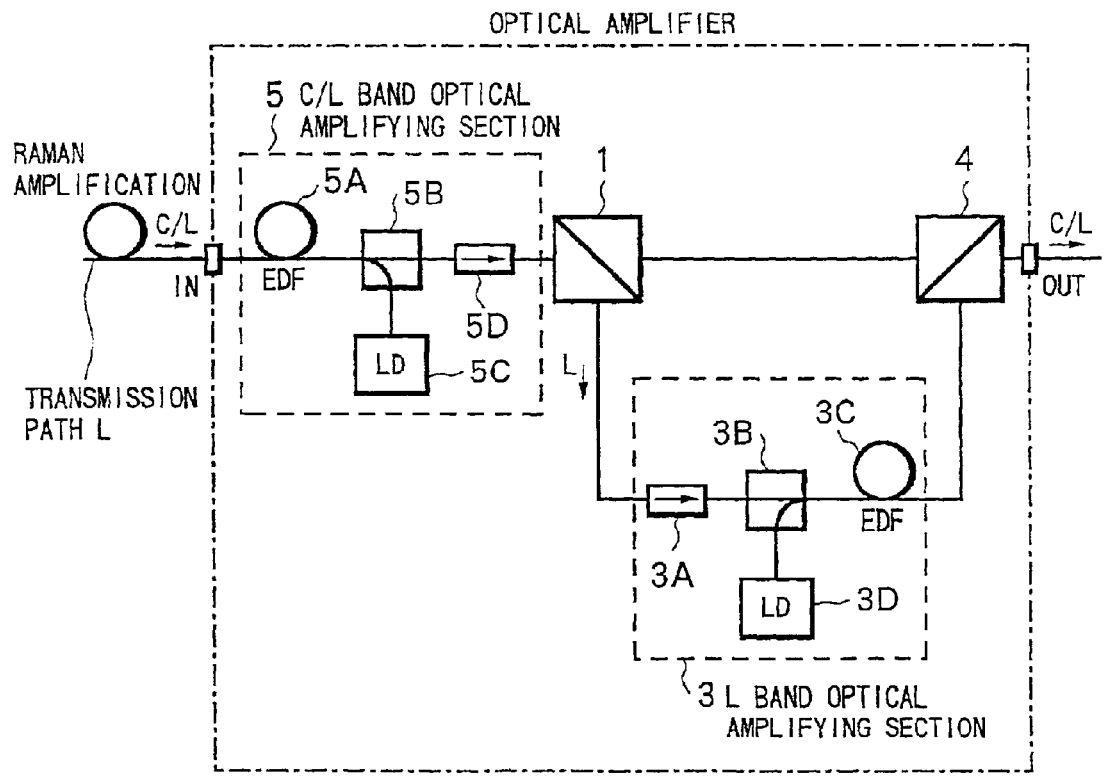
FIG. 4 is a block diagram showing a basic construction of an optical amplifier according to a second embodiment of the present invention.

FIG. 4 is a diagram showing a basic construction of an optical amplifier according to the second embodiment Parts of the same construction as for the first embodiment are denoted by the same reference numerals. The same applies for the subsequent figures.

In FIG. 4, the optical amplifier has a C/L band optical amplifying section 5 as a pre-stage amplification section for amplifying WDM signal light input from an external transmission path L via a terminal IN, a demultiplexer 1 for demultiplexing optical signals which have been amplified by the C/L band optical amplifying section 5 into a C band optical signal and an L band optical signal, an L band optical amplifying section 3 for amplifying L band optical signals which have been demultiplexed by the demultiplexer 1, and a multiplexer 4 for multiplexing the C band optical signals which have been demultiplexed by the demultiplexer 1, and the L band optical signals which have been amplified by the L band optical amplifying section 3, and outputting these to an external transmission path L via a terminal OUT.

The C/L band optical amplifying section 5 comprises for example an EDF 5A, a WDM coupler 5B, an excitation light source (LD) 5C, and an optical isolator 5D.

With the EDF 5A, one end is connected to the terminal IN, and the other end is connected to the WDM coupler 5B, and excitation light generated by the excitation light source 5C is supplied from a rear side via the WDM coupler 5B. With this EDF 5A, the length thereof is optimized so that this has an amplification band for both the C band and the L band. More specifically, as with the case for the optical amplification of the C band described above using FIG. 3, the length etc. is set so that the average population inversion rate in the longitudinal direction of the EDF 5A is 0.55 or more. As a result, the respective optical signals of the C band and the L band are amplified. However, for the optical amplification of the L band, the characteristics are such that the gain thereof is very much smaller than the gain for the C band, and the gain wavelength characteristics also have a comparatively large slope. The excitation light source 5C is a typical light source which can excite the erbium inside the EDF 5A, and which generates excitation light of a wavelength band (for example the 1480 nm band) which can activate Raman amplification inside the external transmission path L with respect to the L band optical signal. The optical isolator 5D passes only light in a direction from the WDM coupler 5B towards the demultiplexer 1.

The demultiplexer 1, the L band optical amplifying section 3 and the multiplexer 4 are the same as those used in the first embodiment, and hence description is omitted. Furthermore, for the external transmission path L connected to the present optical amplifier, as with the case of the first embodiment an optical fiber where the non-linear effective cross section is small compared to the typical 1.3 $\mu$m zero dispersion SMF so that Raman amplification can be easily produced, is at least used, on the side connected to the terminal IN of the optical amplifier. Preferably a hybrid transmission line as shown in FIG. 2 is used with two types of optical fiber connected together.

Next is a description of the operation of the optical amplifier of the second embodiment With the present optical amplifier, due to the excitation light of the 1480 nm band leaked out to the transmission path L from the C/L band optical amplifying section 5 via the terminal IN, Raman amplification is produced in the transmission path L with respect to the L band optical signals, and the WDM signal light which contains the L band optical signals which have been Raman amplified, is input to the C/L band optical amplifying section 5 via the terminal IN.

With the WDM signal light input to the C/L band optical amplifying section 5, the respective optical signals of the C band and the L band are collectively amplified. By means of the amplifying affect of the C/L band optical amplifying section 5, insertion losses in at least the post-stage demultiplexer 1 are compensated for.

The WDM signal light output from the C/L band optical amplifying section 5 is demultiplexed for each of the respective bands by the demultiplexer 1, and the L band optical signals are sent to the L band optical amplifying section 3. In the L band optical amplifying section 3, as with the case of the first embodiment, the L in band optical signals are amplified to a required level by induced emission. Then, the C band optical signals demultiplexed by the demultiplexer 1, and the L band optical signals amplified by the L band optical amplifying section 3 are sent to the multiplexer 4 and coupled, and then output to the transmission path L via the terminal OUT.

As described above, with the second embodiment, the construction is such that there is provided the C/L band optical amplifying section 5 between the terminal IN and the demultiplexer 1, and in the C/L band optical amplifying section 5, the excitation light of the 1480 nm band supplied to the EDF 5A leaks out to the external transmission path L via the terminal IN. Furthermore, since the input level of the L band optical signal input to the present optical amplifier increases by producing Raman amplification in the transmission path L with respect to the L band optical signal, the optical SN ratio of the L band optical signal for the overall optical amplifier can be improved. As a result, the optical SN ratio where heretofore the L band is deteriorated compared to the C band, can be given approximately the same characteristics by using Raman amplification. Of course, as with the conventional case, since the insertion losses of the demultiplexer 1 are also compensated for by the C/L band optical amplifying section 5, there is also the effect of suppressing deterioration of the noise figure due to insertion of the demultiplexer 1.

Next is a description of a third embodiment of the present invention.

With the third embodiment, the case is considered where for example in the second embodiment described above, compensation for the wavelength dispersion and dispersion slope, or compensation for the gain wavelength characteristics can be executed inside the optical amplifier.

Figure 5:
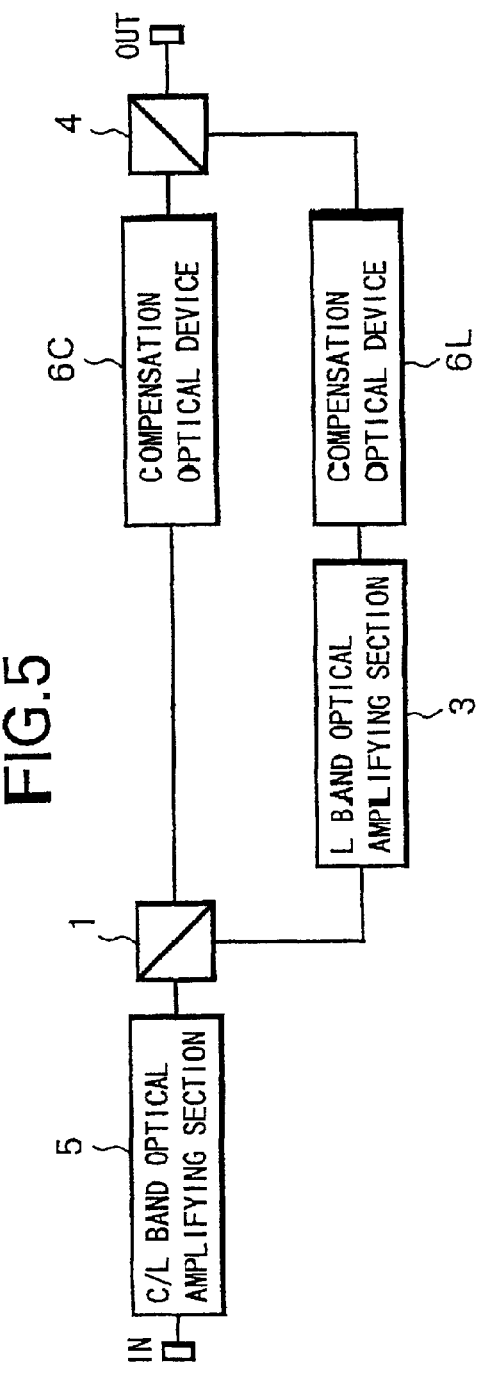
FIG. 5 is a block diagram showing a construction of an optical amplifier according to a third embodiment of the present invention.

FIG. 5 shows a structural example of an optical amplifier according to the third embodiment.

In FIG. 5, the construction of the present optical amplifier is such that compensation optical devices 6C and 6L are respectively provided on the light transmission paths corresponding to the respective bands, between the demultiplexer 1 and the multiplexer 4. Here, the compensation optical device 6C corresponding to the C band is inserted between the demultiplexer 1 and the multiplexer 4, while the compensating optical device 6L corresponding to the L band is inserted between the L band optical amplifying section 3 and the multiplexer 4. The insertion position of the compensating optical device 6L, while not shown in the figure, may be between the demultiplexer 1 and the L band optical amplifying section 3.

For the respective compensating optical devices 6C and 6L, for example these may be typical optical passive parts such as a dispersion compensating fiber (DCF) or a fiber grating used for compensating for wavelength dispersion and dispersion slope which are produced and accumulates in the transmission path L connected to the present optical amplifier. Alternatively, these may be known gain equalizers having a loss wavelength characteristic corresponding to the gain wavelength characteristics of the C/L band optical amplifying section 5 or the L band optical amplifying section 3. In the case where dispersion compensation and compensation for gain wavelength characteristics are carried out at the same time, a DCF and a gain equalizer may be cascade connected for each of the respective bands.

By having the above described construction, then in addition to the operational effect for the case of the second embodiment, wavelength dispersion and dispersion slope or gain deviation between respective wavelengths are compensated for inside the optical amplifier. Hence the transmission characteristics of the WDM signal light can be improved.

Figure 6:
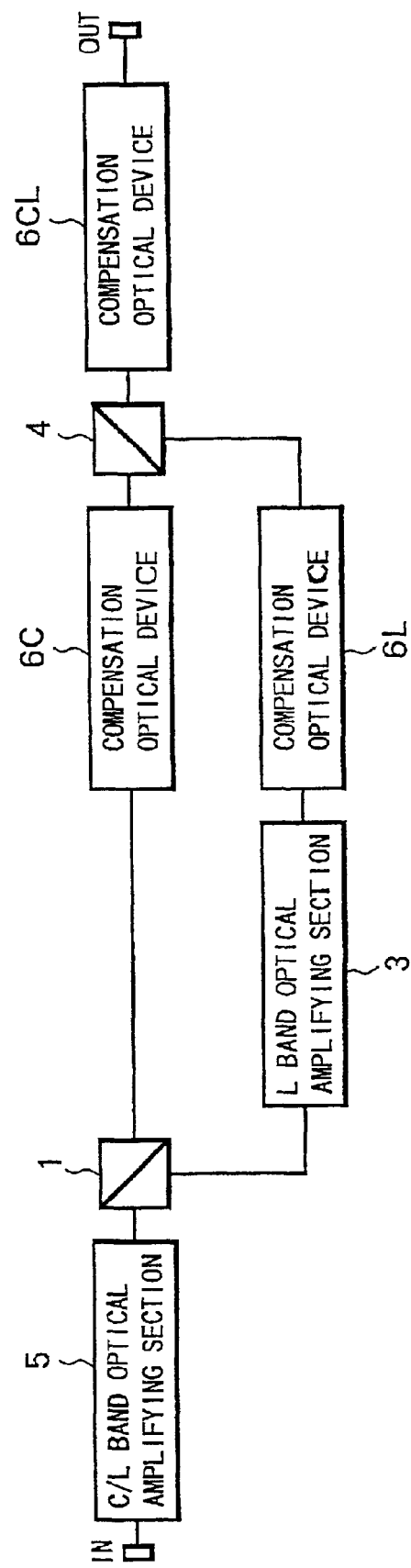
FIG. 6 is a diagram showing another structural example related to the third embodiment.

With the above described third embodiment, the construction is such that there is provided a compensation optical device for each of the respective bands. However for example as shown in FIG. 6, a compensation optical device 6CL which can perform compensation for the C band and the L band collectively, may be also provided between the multiplexer 4 and the terminal OUT.

Next is a description of a fourth embodiment of the present invention.

With the fourth embodiment, the case is considered where for example in the second embodiment described above, automatic level control (ALC) for controlling the output from the optical amplifier to be constant, and automatic gain control (AGC) for controlling the gain in the optical amplifier to be constant, are executed.

Figure 7:
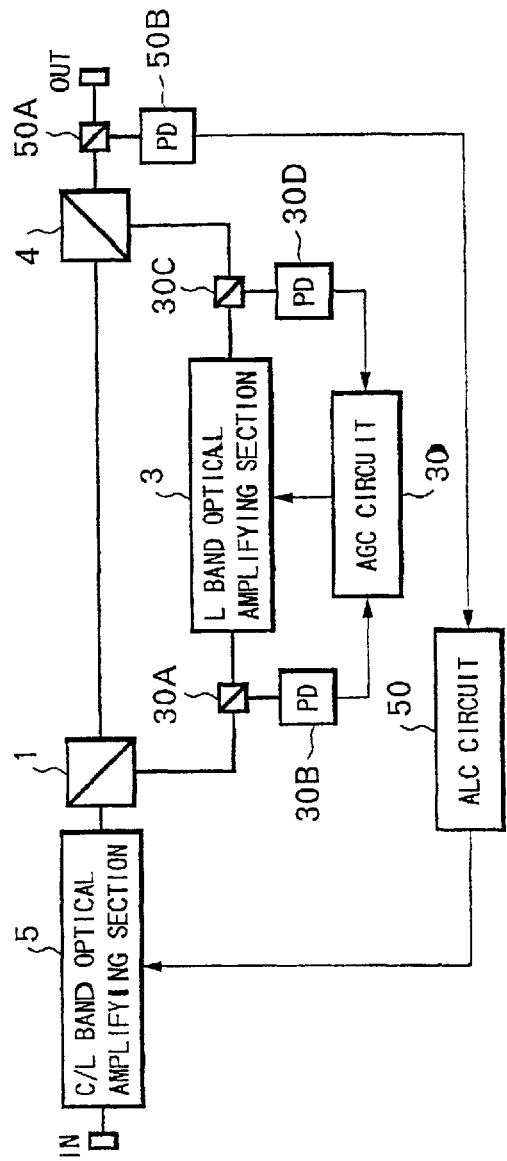
FIG. 7 is a block diagram showing a construction of an optical amplifier according to a fourth embodiment of the present invention.

FIG. 7 shows a structural example of an optical amplifier according to the fourth embodiment.

In FIG. 7, the present optical amplifier is constructed such that there is provided an AGC circuit 30 for the L band optical amplifying section 3, and there is provided an ALC circuit 50 for the C/L band optical amplifying section 5.

The AGC circuit 30 uses a signal for where a part of the L band optical signal for input to the L band optical amplifying section 3 is branched by an optical coupler 30A, and photoelectrically converted by a photodetector 30B, and a signal for where a part of the optical signal output from the L band optical amplifying section 3 is branched by an optical coupler 30C and photoelectrically converted by a photodetector 30D, to compute a gain in the L band optical amplifying section 3, and outputs to the L band optical amplifying section 3, a control signal for controlling the amplification operation so that this gain becomes constant In the L band optical amplifying section 3 which receives the control signal from the AGC circuit 30, for example the injection current or the like of the excitation light source 3D is adjusted according to the control signal.

The ALC circuit 50 compares the signal for where a part of the WDM signal light output from the multiplexer 4 is branched by an optical coupler 50A and photoelectrically converted by a photodetector 50B, with a previously set reference signal, and outputs to the C/L band optical amplifying section 5, a control signal for controlling the amplification operation so that the level of the WDM signal light output from the present optical amplifier becomes constant. In the C/L band optical amplifying section 5 which receives the control signal from the ALC circuit 50, for example the injection current or the like of the excitation light source 5C is adjusted according to the control signal.

As described above, with the fourth embodiment, in addition to the effect for the case of the second embodiment, by subjecting the L band optical amplifying section 3 to AGO operation, then even in the case where the input light level of the L band changes, fluctuations in the gain wavelength characteristics are suppressed. Hence stable optical amplification can be performed. Furthermore, by monitoring the output optical level and subjecting the C/L band optical amplifying section 5 to ALC operation, then even in the case where the input light level to the present optical amplifier changes, a constant level WDM signal light can be output Hence stabilized amplification repeater transmission for the WDM signal light becomes possible.

With the above fourth embodiment, the case is shown for where AGC and ALC are executed concurrently, however control with only one of AGC and ALC can be applied. Furthermore, for the first and third embodiments also, AGO and ALC may be similarly executed. In the case where ALC is applied to the first embodiment, the respective amplification operation for the C band optical amplifying section 2 and the L band optical amplifying section 3 may be adjusted in accordance with the control signal of the ALC circuit Next is a description of a fifth embodiment of the present invention.

With the above described first through fourth embodiments, a part of the excitation light of the 1480 nm band supplied to the EDF is used to produce Raman amplification with respect to the L band optical signal, to thereby improve the optical SN ratio for the L band. With the fifth embodiment, a technique is described for adding an improvement from the viewpoint of simplification of the construction in a conventional optical amplifier which collectively amplifies the C band and the L band optical signals.

Figure 8:
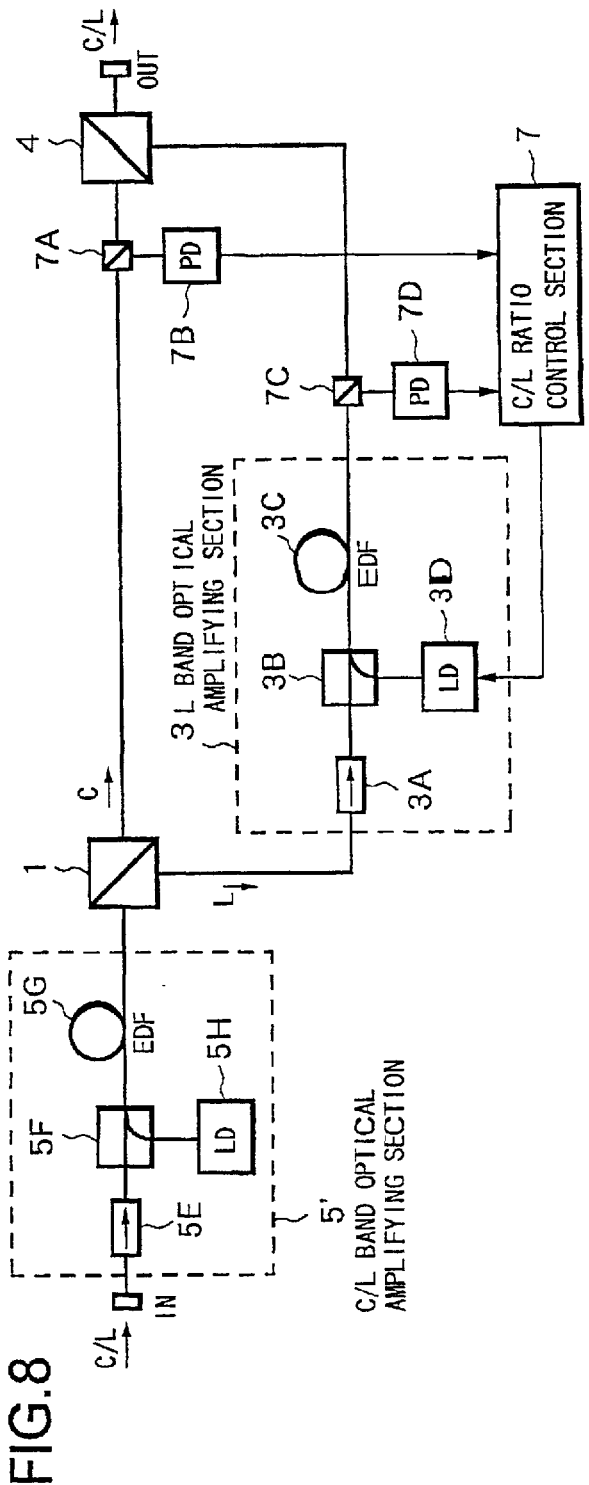
FIG. 8 is a block diagram showing a basic construction of an optical amplifier according to a fifth embodiment of the present invention.

FIG. 8 is a block diagram showing a basic construction of an optical amplifier according to the fifth embodiment.

Figure 24:
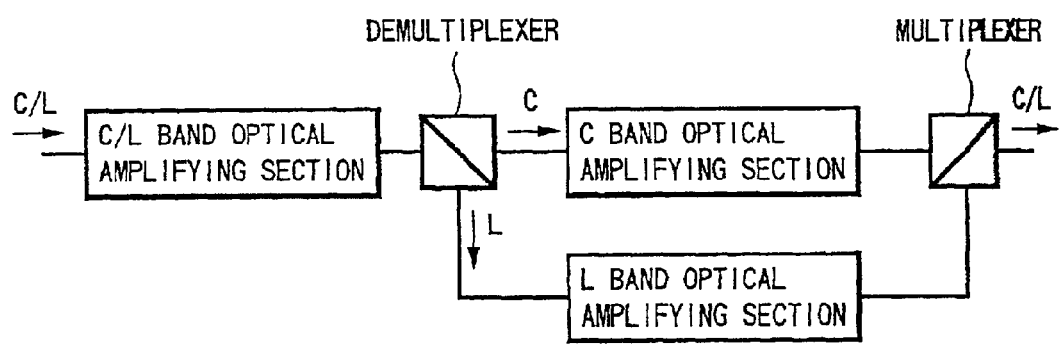
FIG. 24 is a block diagram showing the construction of a conventional C/L band optical amplifier for compensating insertion losses of a demultiplexing device.

In FIG. 8, the present optical amplifier is constructed with the C band optical amplifier in the conventional construction shown in FIG. 24 omitted, and the function of this amplifier is provided in a pre-stage C/L band optical amplifying section 5' and a C/L ratio control section 7 serving as an optical power deviation control device is provided for controlling a balance between the C band optical signal power and the L band optical signal power. A demultiplexer 1 for demultiplexing the WDM signal light output from the C/L band optical amplifying section 5' into a C band and an L band, an L band optical amplifying section 3 corresponding to a post-stage optical amplifying device, and a multiplexer 4 for multiplexing the demultiplexed C band optical signals and the L band optical signals which have been amplified by the L band optical amplifying section 3, are the same as the components used in the aforementioned first embodiment.

The C/L band optical amplifying section 5 corresponding to the pre-stage optical amplifying device, comprises for example an optical isolator 5E, a WDM coupler 5F, an EDF 5G, and an excitation light source (LD) 5H.

The optical isolator 5E is a device for passing only light in a direction from the terminal IN towards the WDM coupler 5F. The WDM coupler 5F couples the WDM signal light which has passed through the optical isolator 5E with excitation light from the excitation light source 5H, and supplies this to the EDF 5G from the front side. For the EDF 5G, similarly to the EDF 5A used in the beforementioned second embodiment (FIG. 4), the length etc. is optimized so as to have an amplifying band for both the C band and the L band. The excitation light source 5H is a typical light source for generating excitation light of a wavelength band (for example a 980 nm band or a 1480 nm band etc.) which can excite the erbium inside the EDF 5G. Here the construction is for a forward excitation type, however a construction for a backward excitation type or a bidirection excitation type is also possible.

The C/L ratio control section 7 outputs a control signal for controlling the amplification operation of the L band optical amplifying section 3 based on a signal for where a part of the optical signal of the C band output from the demultiplexer 1 is branched by an optical coupler 7A and photoelectrically converted by a photodetector (PD) 7B, and a signal for where a part of the optical signal output from the L band optical amplifying section 3 is branched by an optical coupler 7C and photoelectrically converted by a photodetector 7D. Here the optical coupler 7A and the photodetector 7B correspond to a first power monitor device, and the optical coupler 7C and the photodetector 7D correspond to a second power monitor device.

With the optical amplifier of the above described construction, the WDM signal light which has been input via the terminal IN is sent to the C/L band optical amplifying section 5', and the respective optical signals of the C band and the L band are collectively amplified. By means of the amplifying affect of the C/L band optical amplifying section 5', the C band optical signal is amplified to a required output level or above. Furthermore, for the L band optical signal, the insertion losses in at least the post-stage demultiplexer I are compensated for.

The WDM signal light output from the C/L band optical amplifying section 5' is demultiplexed for each of the respective bands by the demultiplexer 1, and the L band optical signals are sent to the L band optical amplifying section 3. In the L band optical amplifying section 3, the L band optical signals are amplified to a required level by induced emission.

Then, the C band optical signals which have been demultiplexed by the demultiplexer 1, and the L band optical signals which have been output from the L band optical amplifying section 3 are passed through the optical couplers 7A and 7C, respectively, and then multiplexed by the multiplexer 4, and output from the terminal OUT. Together with this, a part of these optical signals is branched by the optical couplers 7A and 7C and then sent to the C/L ratio control section 7 via the photodetectors 7B and 70. In the C/L ratio control section 7, a control signal is output for controlling the amplification operation of the L band optical amplifying section 3 based on signals from the respective photodetectors 7B and 7D, so that the C band optical signal power and the L band optical signal power become a previously set ratio. More specifically, for example in the case of a situation where a 32 channel optical signal is used for the C band, and a 16 channel optical signal is used for the L band (to make the optical power of the respective channels the same), a control signal is generated for controlling the amplification operation of the L band optical amplifying section 3 so that the ratio of the C band optical signal power and the L band optical signal power becomes constant at 2:1. In the L band optical amplifying section 3 which has received the control signal from the C/L ratio control section 7, for example the injection current or the like of the excitation light source 3D is adjusted according to the control signal.

In the above manner, the construction is such that, in the fifth embodiment, for the C/L band optical amplifying section 5' provided in the input stage, the construction is such that the C band optical signal is amplified to a sufficient level, while the L band optical signal, only for the insufficient gain portion, is amplified by the post-stage L band optical amplifying section 3. As a result, simplification of the construction compared to for the conventional optical amplifier can be achieved. This is particularly useful when the installation space or power consumption is limited, such as in the case for example where the optical amplifier is employed as an undersea repeater, since the number of parts for the excitation light source can be reduced. However, the optical amplifier of the present invention is not limited to the above use. For example by enabling control of the balance of the optical power of the C band and the L band, the optical amplification of the respective bands can be carried out more stably, and also it is possible to flexibly correspond for example to changes etc. in the channels used for the respective bands.

With the fifth embodiment, the construction is such that balance control is performed for the optical power of the C band and the L band. However with a system construction where such control is not necessary, the C/L ratio control section 7, the optical couplers 7A and 7C and the photodetectors 7B and 7D can be omitted.

Next is a description of a sixth embodiment of the present invention.

With the sixth embodiment, the case is considered where in the fifth embodiment, compensation for the wavelength dispersion and dispersion slope, or compensation for the gain wavelength characteristics can be executed inside the optical amplifier.

Figure 9:
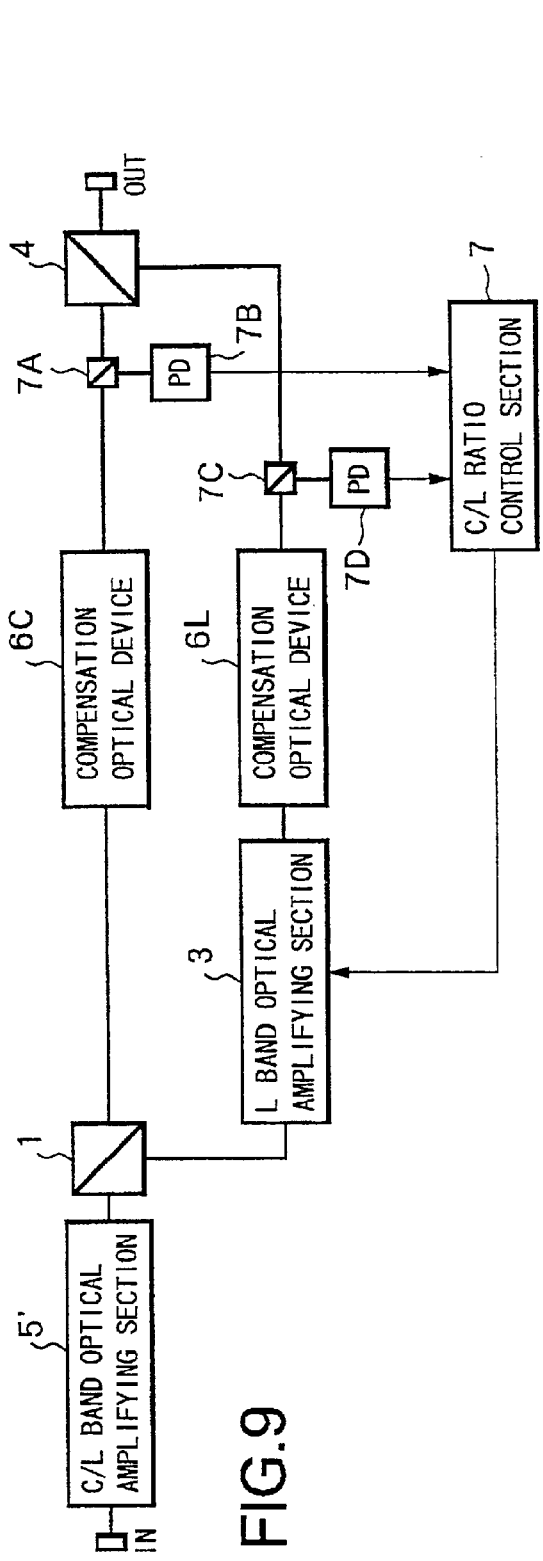
FIG. 9 is a block diagram showing a construction of an optical amplifier according to a sixth embodiment of the present invention.

FIG. 9 shows a structural example of an optical amplifier according to the sixth embodiment.

In FIG. 9, the construction of the present optical amplifier, as with the case of the third embodiment described above, is such that compensation optical devices 6C and 6L are respectively provided on the light transmission paths corresponding to the respective bands between the demultiplexer 1 and the multiplexer 4. Here the compensation optical device 6C corresponding to the C band is inserted between the demultiplexer 1 and the optical coupler 7A, while the compensating optical device 6L corresponding to the L band is inserted between the L band optical amplifying section 3 and the optical coupler 7C. For the respective compensating optical devices 6C and 6L, for example, these may be typical optically passive parts such as a dispersion compensating fiber (DCF) or a fiber grating, or these may be known gain equalizers. The insertion position for the respective compensation optical devices 6C and 6L is not limited to the abovementioned positions, and these may be optionally positioned on the respective light transmission paths between the demultiplexer 1 and the multiplexer 4.

In this manner, with the sixth embodiment, in addition to the operational effect for the case of the fifth embodiment, wavelength dispersion and dispersion slope or gain deviation between respective wavelengths is compensated inside the optical amplifier. Hence the transmission characteristics of the WDM signal light can be improved.

Figure 10:
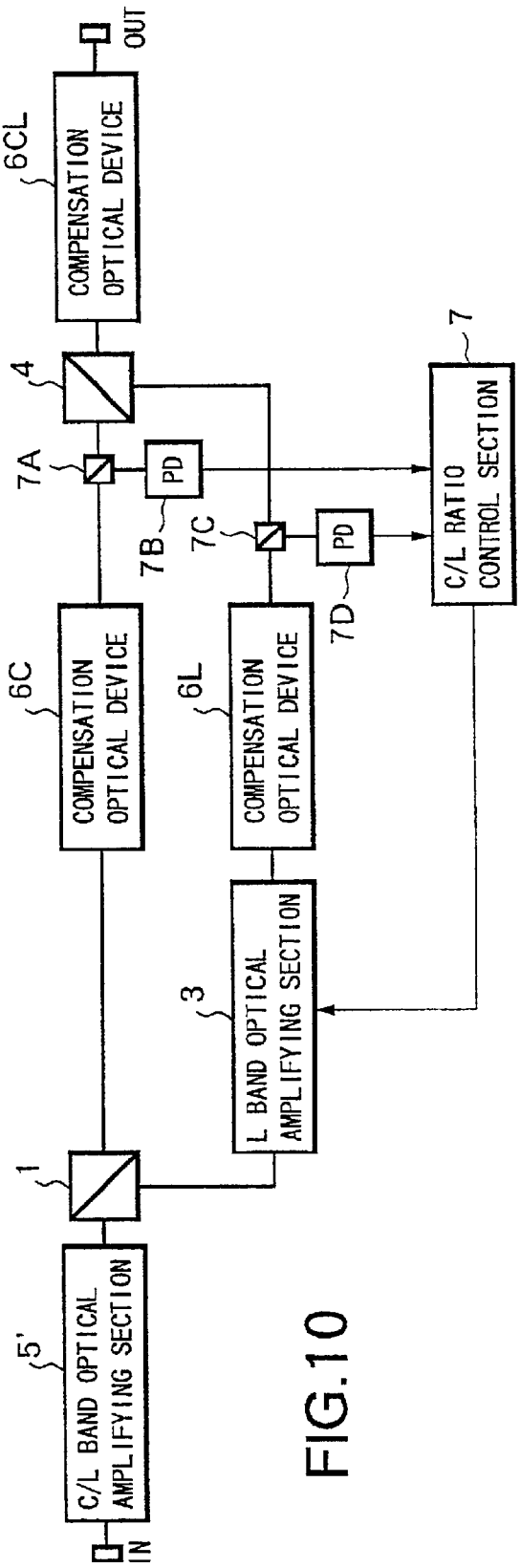
FIG. 10 is a diagram showing another structural example related to the sixth embodiment.

With the above described sixth embodiment, the construction is such that there is provided a compensation optical device for each of the respective bands. However for example as shown in FIG. 10, a compensation optical device 6CL which can perform compensation for the C band and the L band collectively, may be also provided between the multiplexer 4 and the terminal OUT.

Next is a description of the seventh embodiment of the present invention.

With the seventh embodiment, the case is considered where in the fifth embodiment described above, automatic level control (ALC) for controlling the output from the optical amplifier to be constant, and automatic gain control (AGC) for controlling the gain in the optical amplifier to be constant are executed.

Figure 11:
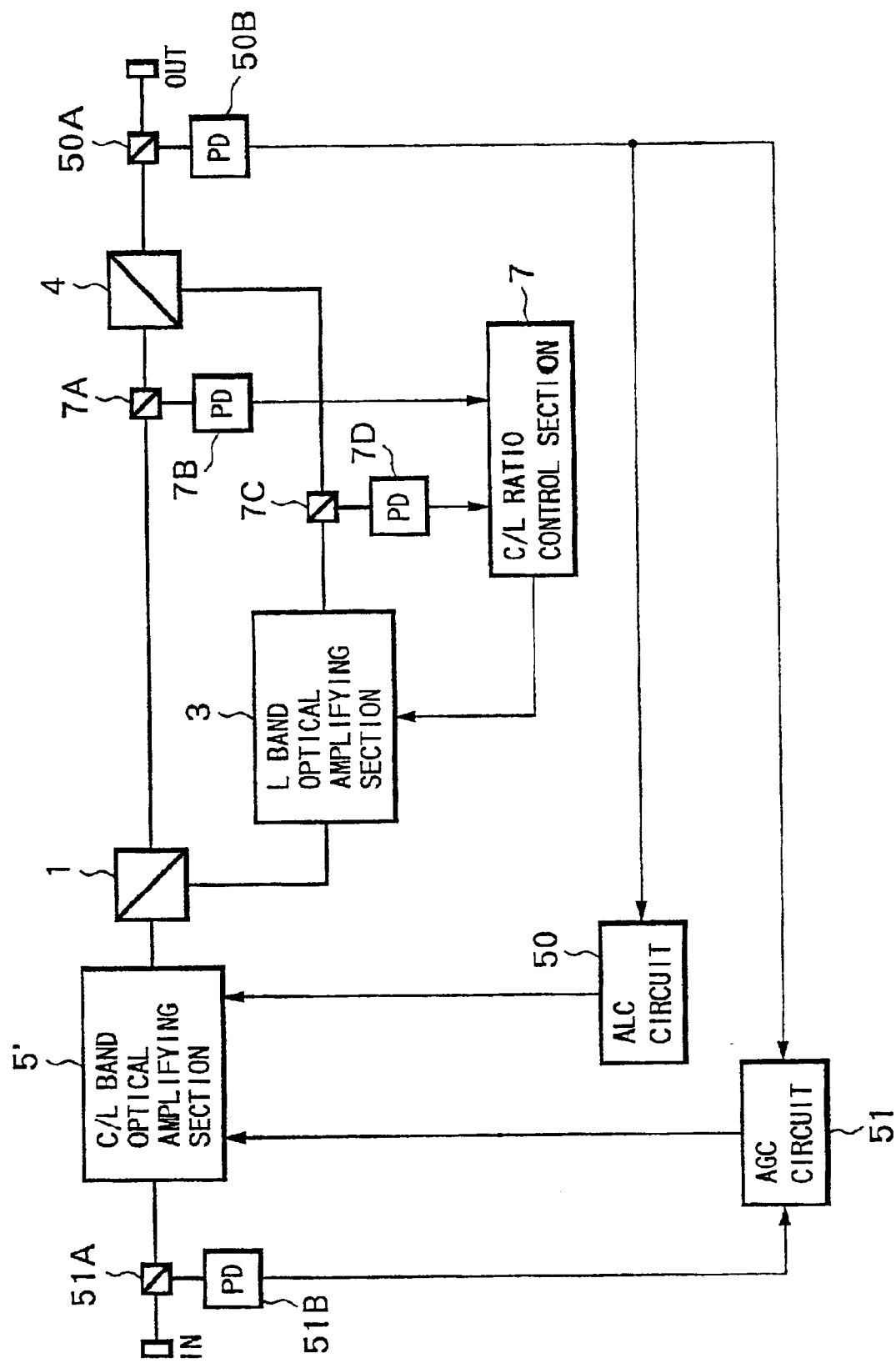
FIG. 11 is a block diagram showing a construction of an optical amplifier according to a seventh embodiment of the present invention.

FIG. 11 shows a structural example of an optical amplifier according to the seventh embodiment.

In FIG. 11, the present optical amplifier is constructed such that there is provided an ALC circuit 50 and an AGC circuit 51 for the C/L band optical amplifying section 56. The ALC circuit 50, as with the case of the fourth embodiment, compares the signal for where a part of the WDM signal light output from the multiplexer 4 is branched by an optical coupler 50A and photoelectrically converted by a photodetector 50B, with a previously set reference signal, and outputs to the C/L band optical amplifying section 5', a control signal for controlling the amplification operation so that the level of the WDM signal light output from the optical amplifier becomes constant.

The AGC circuit 51 uses a signal for where a part of the WDM signal light for input to the C/L band optical amplifying section 5' is branched by an optical coupler 51A, and photoelectrically converted by a photodetector 51B, and a monitor signal for the output light used in the ALC (the signal via the optical coupler 50A and the photodetector 50B), to compute a gain in the overall optical amplifier, and outputs to the C/L band optical amplifying section 5', a control signal for controlling the amplification operation so that this gain becomes constant.

In the C/L band optical amplifying section 5' which receives the respective control signals from the ALC circuit 50 and the AGO circuit 51, for example the drive condition or the like of the excitation light source 5C is adjusted according to the respective control signals.

In the above manner, with the seventh embodiment, in addition to the operational effect for the case of the fifth embodiment, by operating the C/L band optical amplifying section 5' under the control of ALC and AGC, then even in the case where the input optical level changes, a constant level WDM signal light can be output. Moreover, changes in the gain wavelength characteristics can be suppressed, and amplification of the WDM signal light can be stably performed.

Figure 12:
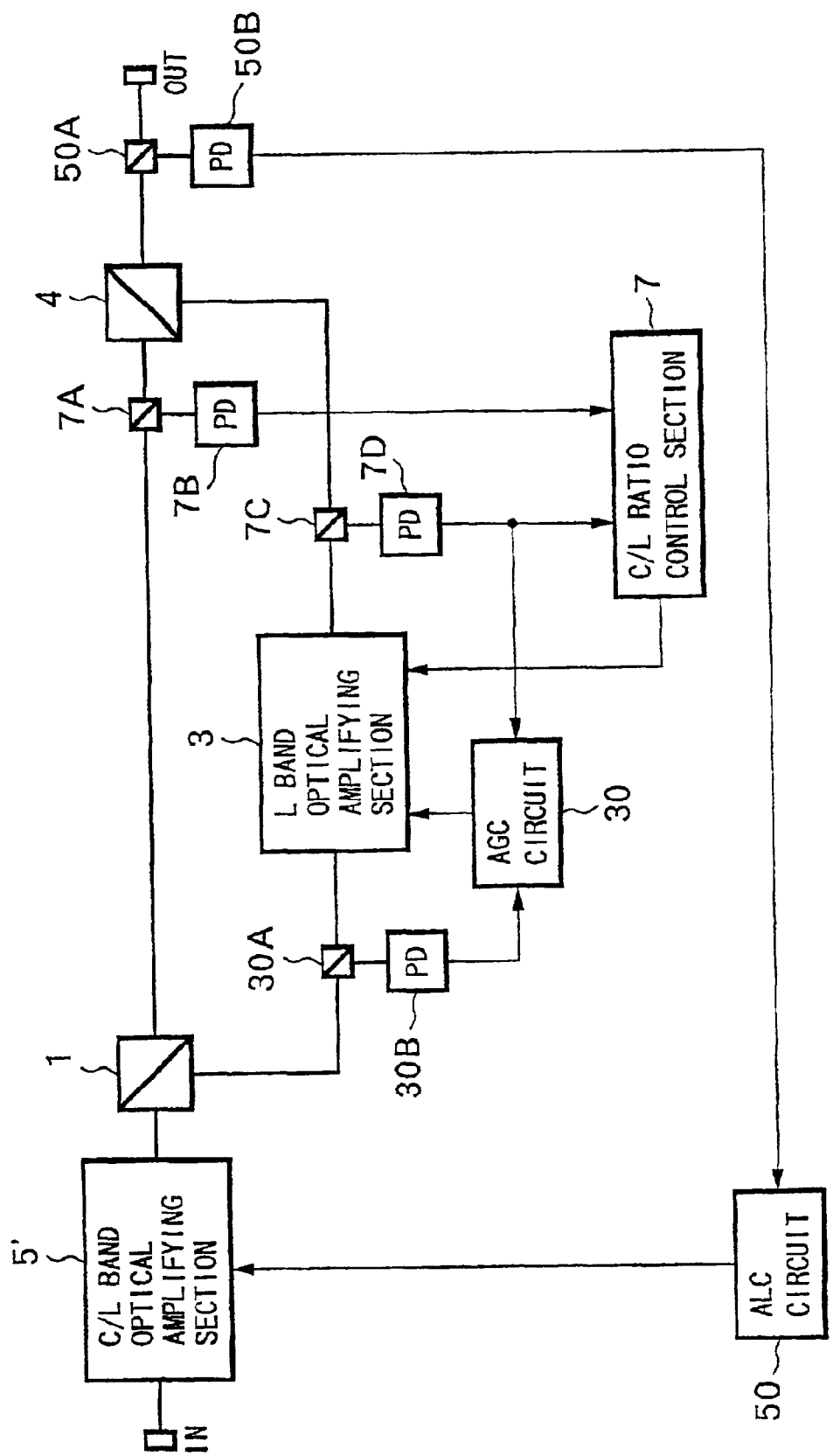
FIG. 12 is a diagram showing another structural example related to the seventh embodiment.

With the seventh embodiment, the case is shown for where AGC and ALC are executed concurrently, however control with only one of AGC and ALC can be applied. Furthermore, the C/L band optical amplifying section 5' is constructed for AGC operation. However the L band optical amplifying section 3 may be for AGC operation. More specifically, as shown in FIG. 12, an AGC circuit 30 may be provided, and a signal for where a part of the light signal for input to the L band optical amplifying section 3 is branched by an optical coupler 30A, and photoelectrically converted by a photodetector 30B, and a monitor signal of the L band used in the C/L ratio control (the signal via the optical coupler 7C and the photodetector 7D), are used to compute a gain in the L band optical amplifying section 3, and a control signal for controlling the amplification operation so that this gain becomes constant then is sent from the AGC circuit 30 to the L band optical amplifying section 3. Furthermore, the above mentioned construction of FIG. 11 or FIG. 12 may also be applied to the sixth embodiment.

Next is a description of an eighth embodiment of the present invention.

With the eighth embodiment, the description is given for the case where the first through fourth embodiments which use Raman amplification, and the fifth through seventh embodiments with simplified construction, and for which balance control for each band is possible, are combined together.

Figure 13:
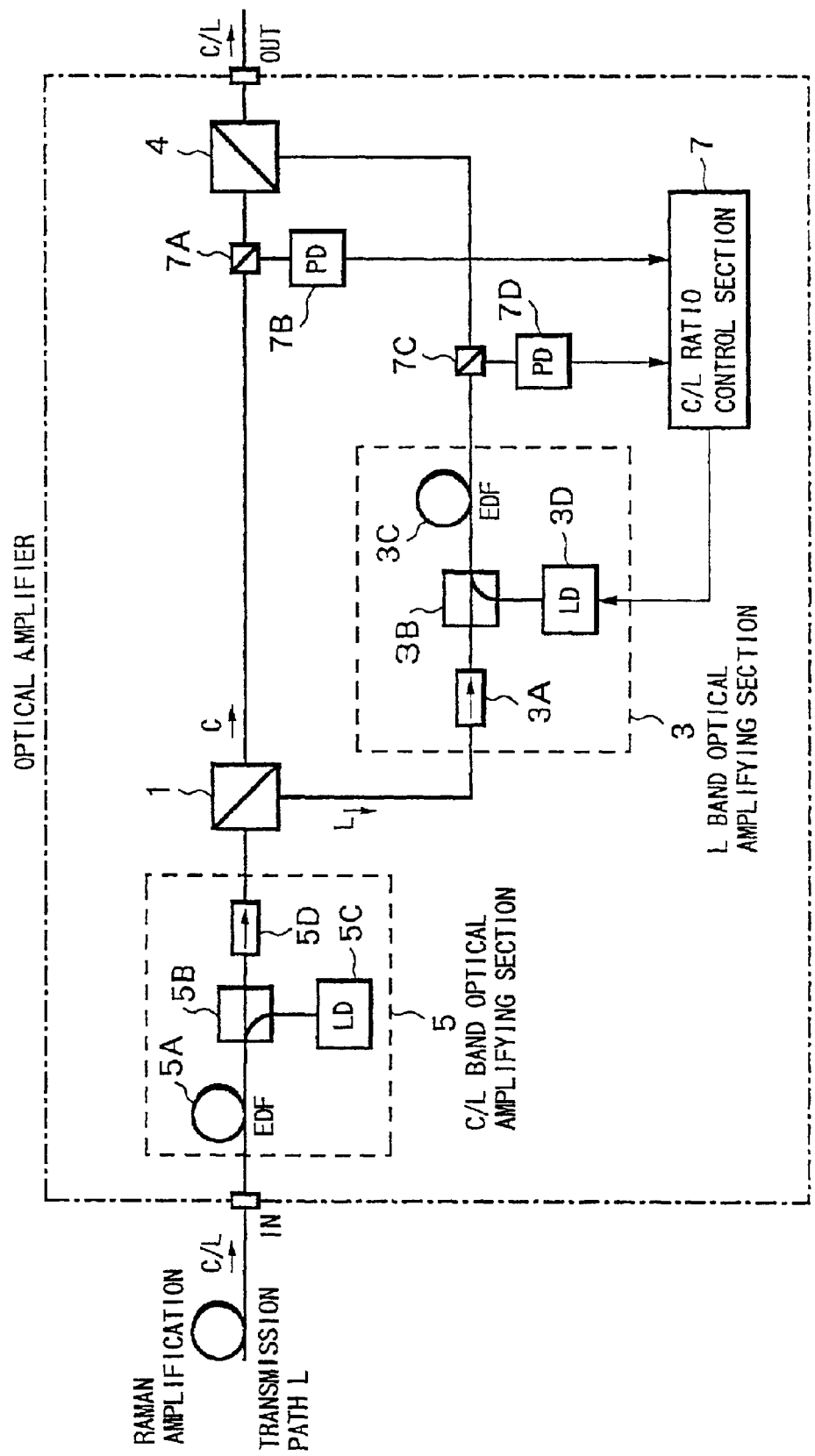
FIG. 13 is a block diagram showing a basic construction of an optical amplifier according to an eighth embodiment of the present invention.

FIG. 13 is a block diagram showing a basic construction of an optical amplifier according to the eighth embodiment.

As shown in FIG. 13, with the present optical amplifier, the C band optical amplifying section 2 in the construction of the second embodiment shown in FIG. 4 is omitted, and the function of this amplifying section is provided in a pre-stage C/L band amplifier section 5. Moreover, as with the case of the fifth embodiment, there is provided the C/L ratio control section 7, the optical couplers 7A and 7C, and the photodetectors 7B and 7D, and balance control is performed for the optical power of the C band and the L band.

The construction of the C/L band optical amplifying section 5, as with the case of the second embodiment, is such that a part of the excitation light of the 1480 nm band supplied from the rear side to the EDF 5A, is leaked out to the transmission path L via the terminal IN. For the transmission path L connected to the optical amplifier is an optical fiber where the non-linear effective cross section is small compared to the 1.3 μm zero dispersion SMF so that Raman amplification can be easily produced, and is at least used on the side connected to the terminal IN of the optical amplifier.

With the optical amplifier of the abovementioned construction, due to the excitation light of the 1480 nm band leaked out to the transmission path L from the C/L band optical amplifying section 5, Raman amplification is produced in the transmission path L with respect to the L band optical signals, and the WDM signal light which contains the L band optical signals which have been Raman amplified, is input to the C/L band optical amplifying section 5 via the terminal IN, and the respective optical signals of the C band and the L band are collectively amplified by the induced emission.

The WDM signal light output from the C/L band optical amplifying section 5 is demultiplexed for each of the respective bands by the demultiplexer 1, and the L band optical signals are sent to the L band optical amplifying section 3 and amplified to a required level by induced emission. Then, the C band optical signals demultiplexed by the demultiplexer 1, and the L band optical signals output from the L band optical amplifying section 3, are multiplexed by the multiplexer 4 and output to the transmission path L via the terminal OUT. Moreover, a part of these optical signals are sent to the C/L ratio control section 7 via the optical couplers 7A and 7C, and the photodetectors 7B and 7D respectively, and balance control of the C band and the L band is executed.

In this way, with the eighth embodiment, by having the construction where the C band optical signal is amplified to a sufficient level in the C/L band optical amplifying section 5, using the C/L band optical amplifying section 5 of a construction where the excitation light of the 1480 nm band leaks out to the transmission path L, while the L band optical signal, only for the insufficient gain portion, is amplified by the post-stage L band optical amplifying section 3, an optical amplifier where an improvement is achieved in the optical SN ratio for the L band optical signal by the Raman amplification in the transmission path L, can be realized with a simple construction. As a result, an optical amplifier of reduced power consumption which can collectively amplify wide band WDM signal light, with excellent characteristics can be provided. Furthermore, by enabling balance control of the C band and the L band, optical amplification for the respective bands can be more stably performed, and can also flexibly correspond to changes etc in the channels being used.

As with the case of the sixth embodiment, while not shown in the figure, compensation optical devices are respectively provided corresponding to each band, and compensation for the wavelength dispersion and dispersion slope, or compensation for the gain wavelength characteristics can be executed inside the optical amplifier.

Furthermore, as with the case of the seventh embodiment, at the time of executing ALC and AGC, the construction as shown in FIG. 12 is suitable. As shown in FIG. 11, with the construction where the C/L band optical amplifying section is AGC operated, in order to monitor the input level it is necessary to insert an optical coupler at a pre-stage of the C/L band amplifier section. However, since excitation light from the C/L band optical amplifying section towards the transmission path is attenuated by the optical coupler, there is a situation where application of the construction shown in FIG. 11 to the eighth embodiment is difficult Next, for the abovementioned eighth embodiment, specific structural examples are further enumerated hereunder corresponding to an up line and a down line. Components of the down line corresponding to the up line are denoted by the same reference numerals.

Figure 14:
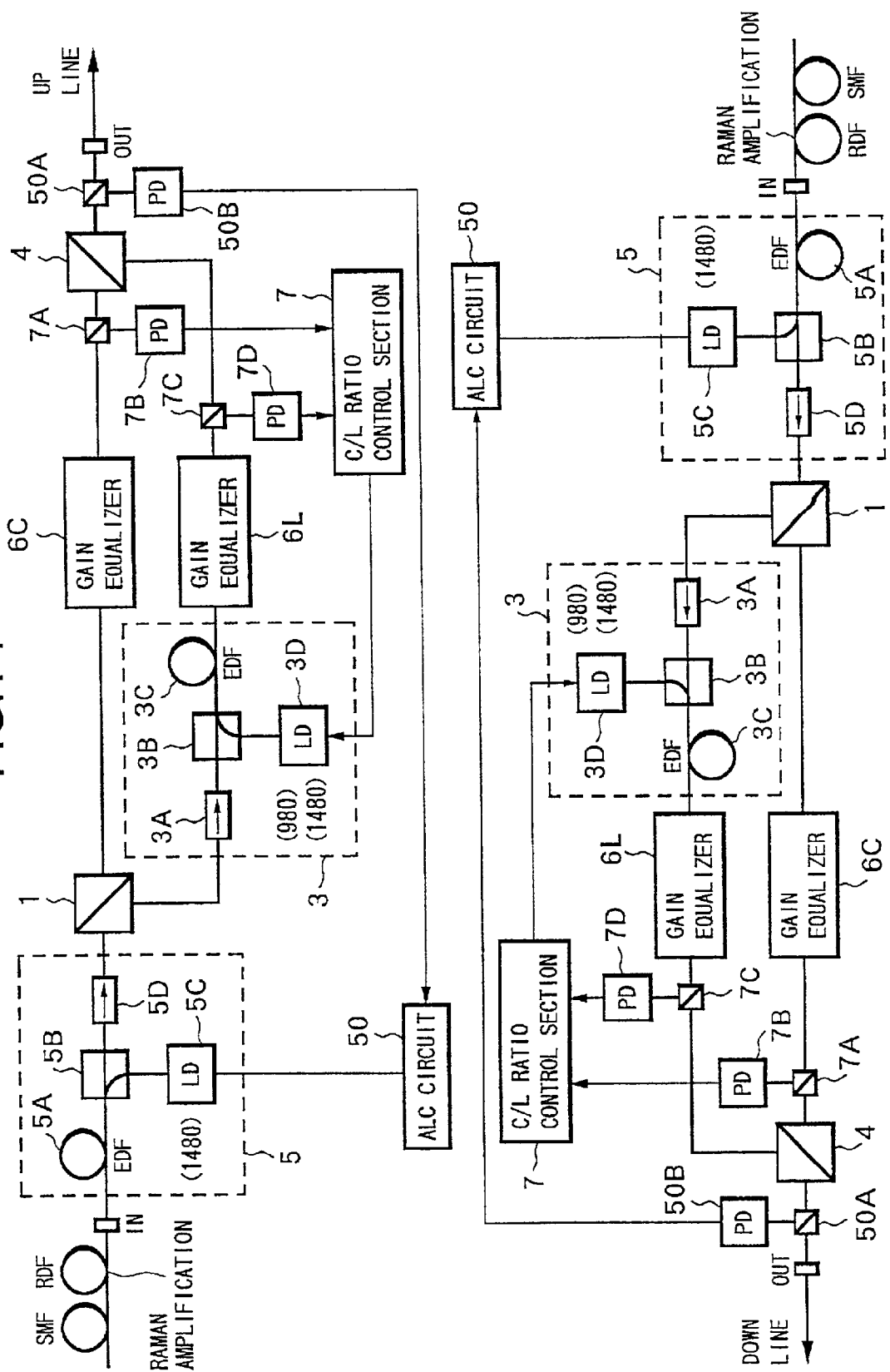
FIG. 14 is a diagram showing a specific structural example (1) of the eighth embodiment.

With a structural example (1) of the optical amplifier shown in FIG. 14, the construction is such that for the basic construction shown in FIG. 13, there is provided compensation optical devices (here for example gain equalizers) 6C and 6L corresponding to the respective bands, and the C/L band optical amplifying section 5 is ALC operated. These constructions are provided respectively to the up line and the down line. For the excitation wavelength of the L band optical amplifying section 3, either the 980 nm band or the 1480 nm band may be selected.

In the case of the 980 nm band, a low noise and low power consumption are possible, while with the 1480 nm band, a high output is possible.

With the abovementioned construction, C band and L band optical amplification can be executed with as little as four excitation light sources for the up line and down line, and the improvement effect in optical SN ratio of the L band due to Raman amplification is also obtained. Furthermore, a constant level WDM signal light can be output by ALC operation, and balance control of the optical power of the C band and the L band is also possible. Moreover, this construction also has the advantage in that the up line and down line can be controlled independently and individually.

Figure 15:
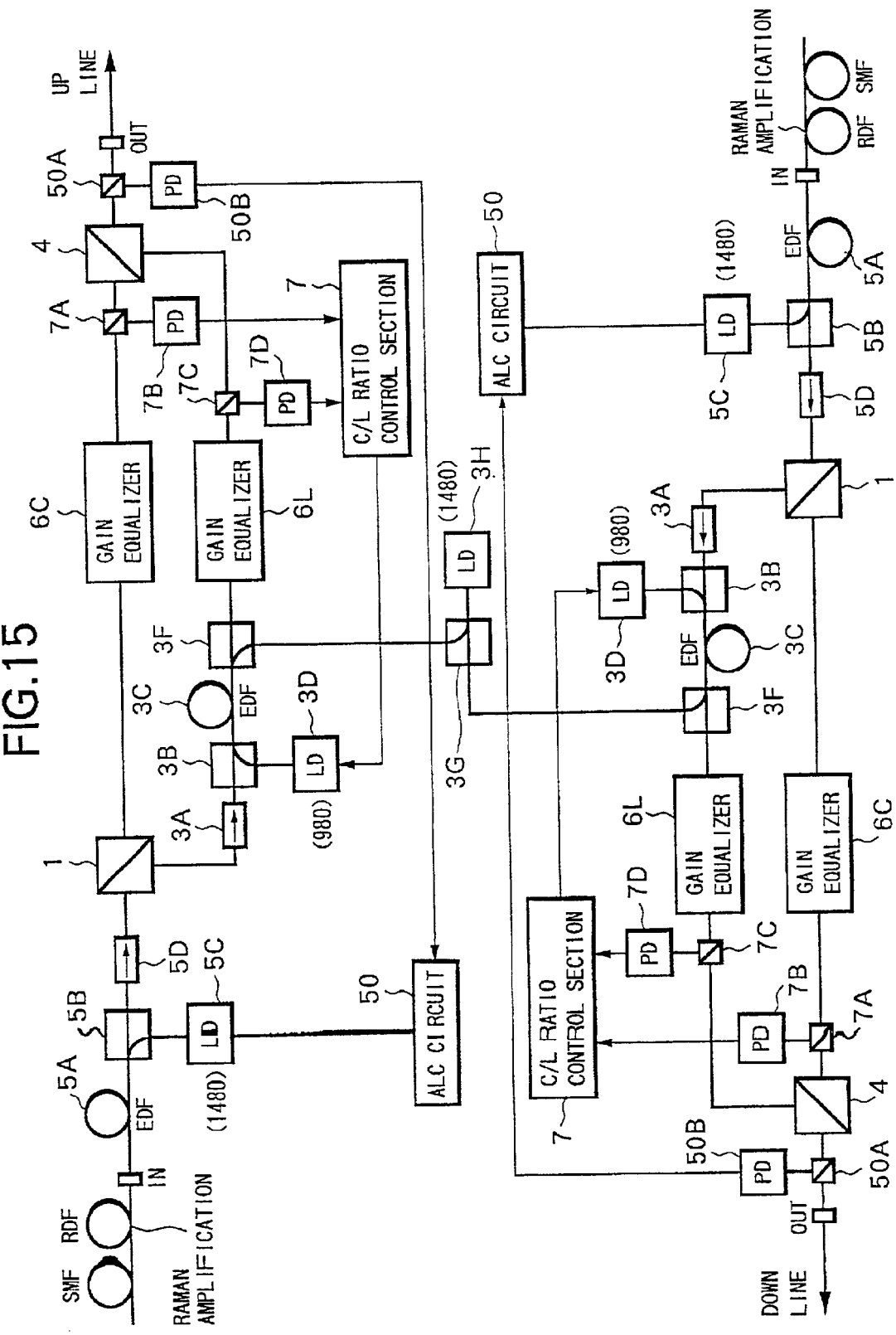
FIG. 15 is a diagram showing a specific structural example (2) of the eighth embodiment.

A structural example (2) of the optical amplifier shown in FIG. 15 achieves an improvement in the excitation efficiency by having the L band optical amplifying section as a bidirection excitation type construction. Here, for the respective up and down lines, excitation light of the 980 nm band output from the excitation light source 3D is supplied from the front side to the EDF 3C via the optical coupler 3B. Moreover, excitation light of the 1480 nm band output from an excitation light source 3H which is used in common for the up and down lines, is supplied from the rear side to the EDF 3C via optical couplers 3G and 3F.

With the above described construction, by adding one excitation light source of the 1480 nm band to the structural example (1) shown in FIG. 14, then for the respective up and down lines, L band optical amplification with excellent excitation efficiency can be realized. Other operational effects are the same as for the case of structural example (1).

Figure 16:
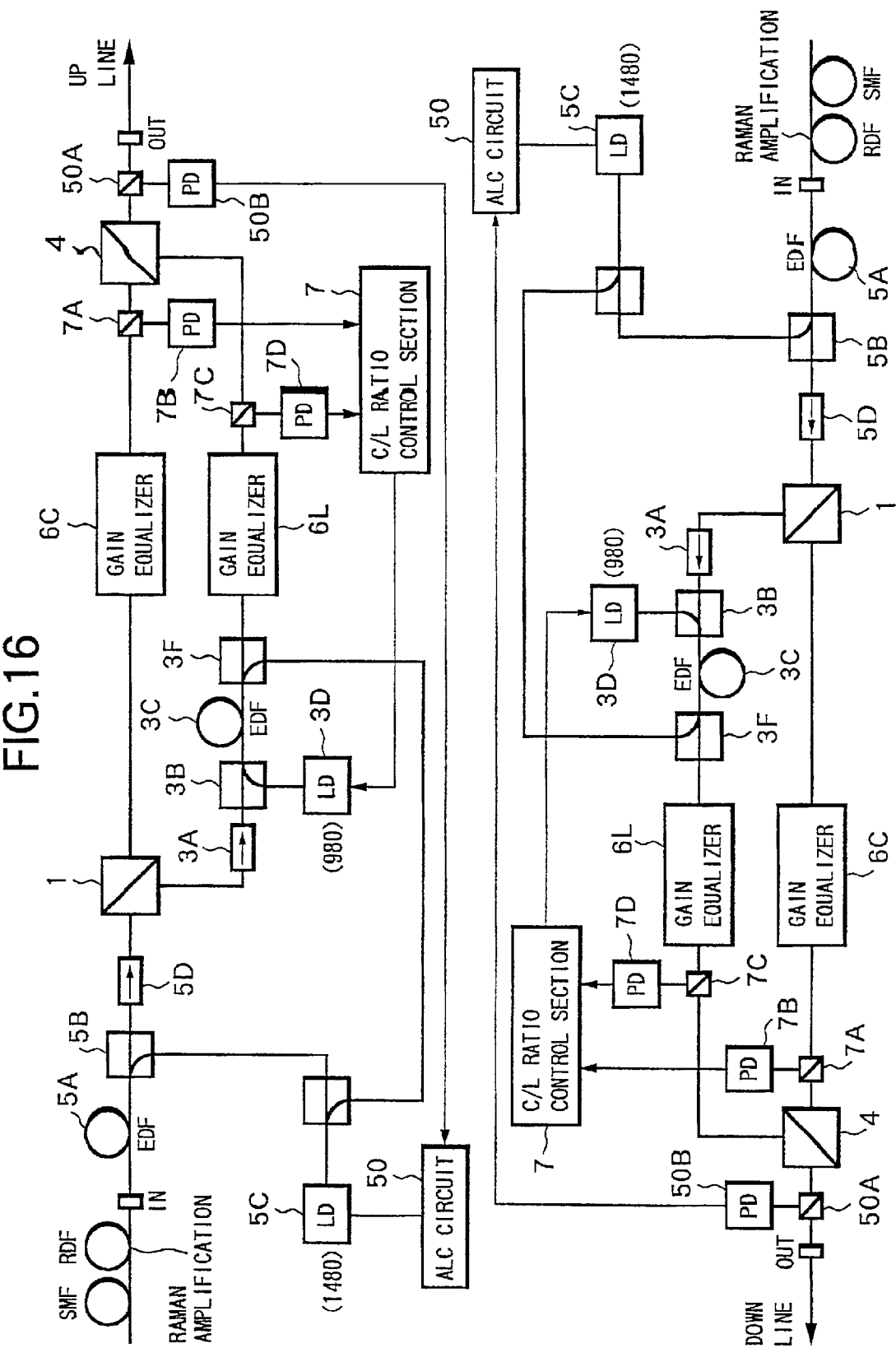
FIG. 16 is a diagram showing a modified example related to the structural example (2) of the eighth embodiment.

Here, with the above described example, the construction is such that the rear excitation light source of the L band optical amplifying section is used in common for the up and down lines. However instead of this, for example as shown in FIG. 16, an excitation light source 5C of the 1480 nm band between the C/L band optical amplifying section and the L band optical amplifying section, may also be used in common with each of the up line and the down line.

Figure 17:
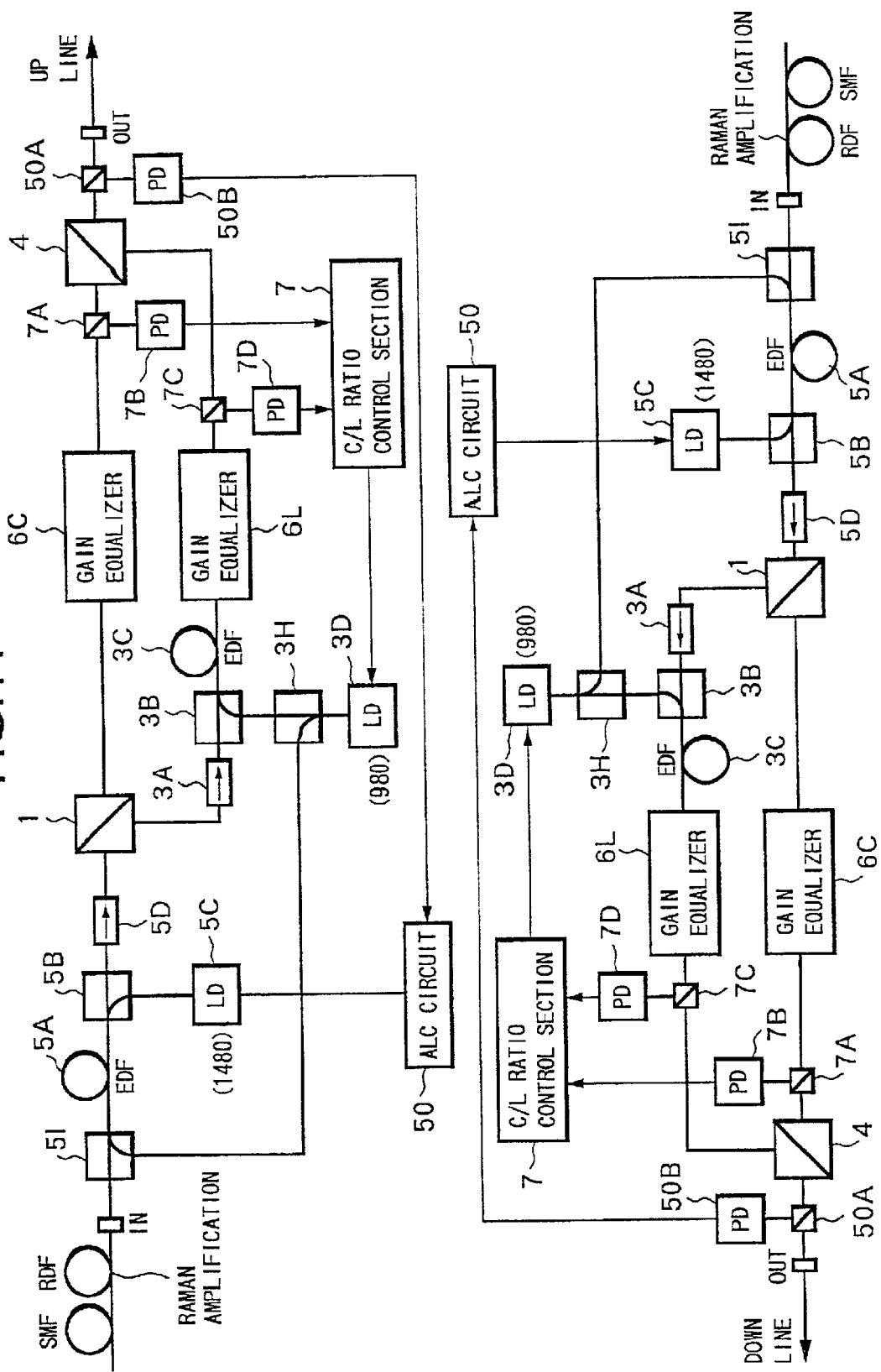
FIG. 17 is a diagram showing a specific structural example (3) of the eighth embodiment.

A structural example (3) of the optical amplifier shown in FIG. 17, achieves an improvement in the noise figure by having a construction of a bidirection excitation type where front excitation light is supplied to the C/L band optical amplifying section. Here, for the respective up and down lines, excitation light of the 980 nm band output from the excitation light source 3D is branched in two by an optical coupler 3H, and the branched respective excitation lights are supplied from the front side to the EDFs 5A and 3C via optical couplers 51 and 3B. Further, the branching ratio for the optical coupler 3H is set so that the excitation optical power supplied to the L band optical amplifying section is greater than the excitation optical power supplied to the C/L band optical amplifying section.

With the abovementioned construction, a part of the excitation light used for L band optical amplification, is used as front excitation light for the C/L band optical amplifying section. In this way, the noise figure for the C/L band optical amplifying section can be improved without increasing the number of excitation light sources. Other operational effects are the same as for the case of structural example (1).

Figure 18:
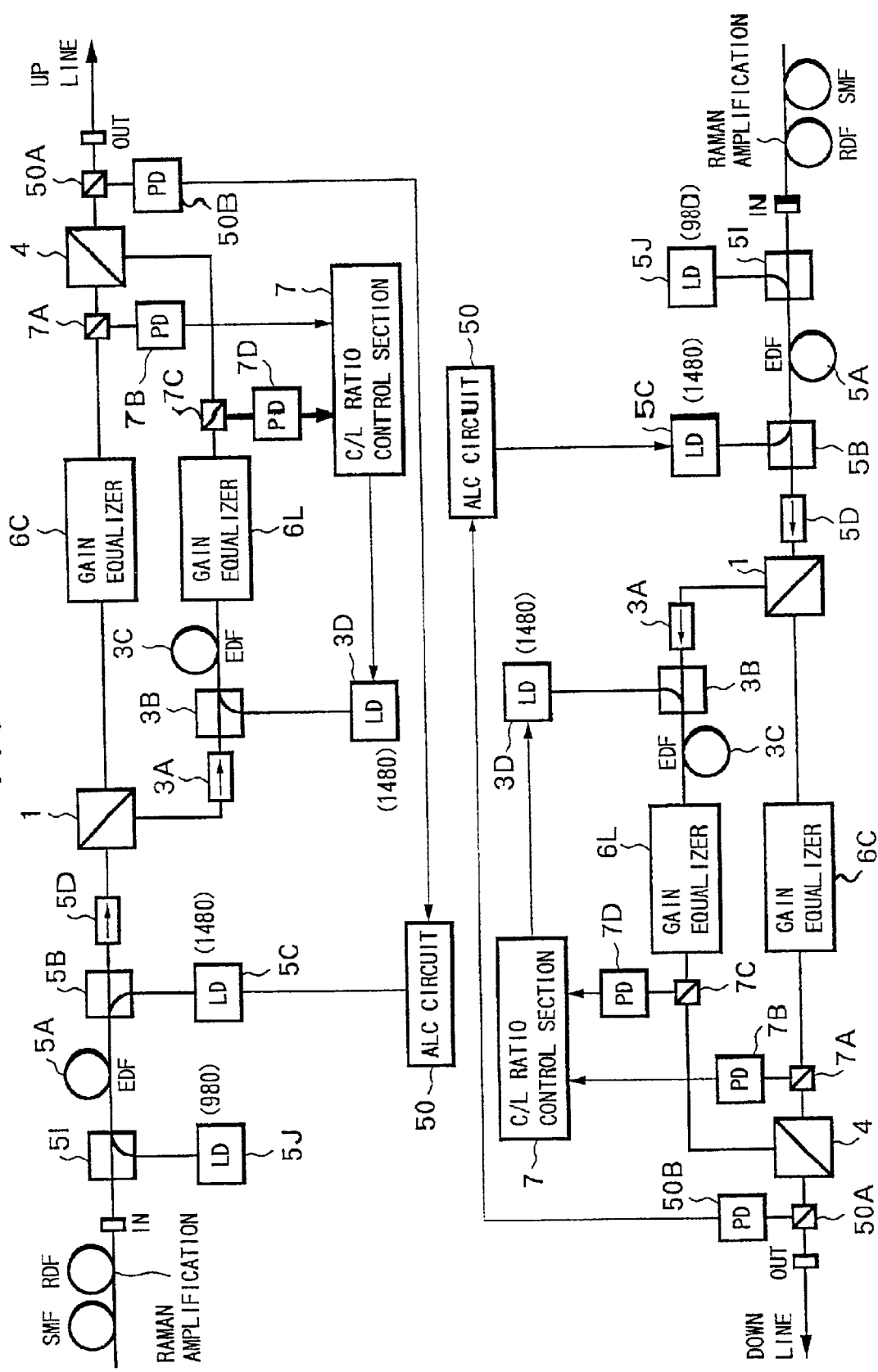
FIG. 18 is a diagram showing a modified example related to the structural example (3) of the eighth embodiment.

In the case where an excitation light of the 1480 nm band is used for L band optical amplification, then for example as shown in FIG. 18, an excitation light source 5J of the 980 nm band may be separately provided for front excitation of the C/L band optical amplifying section.

Figure 19:
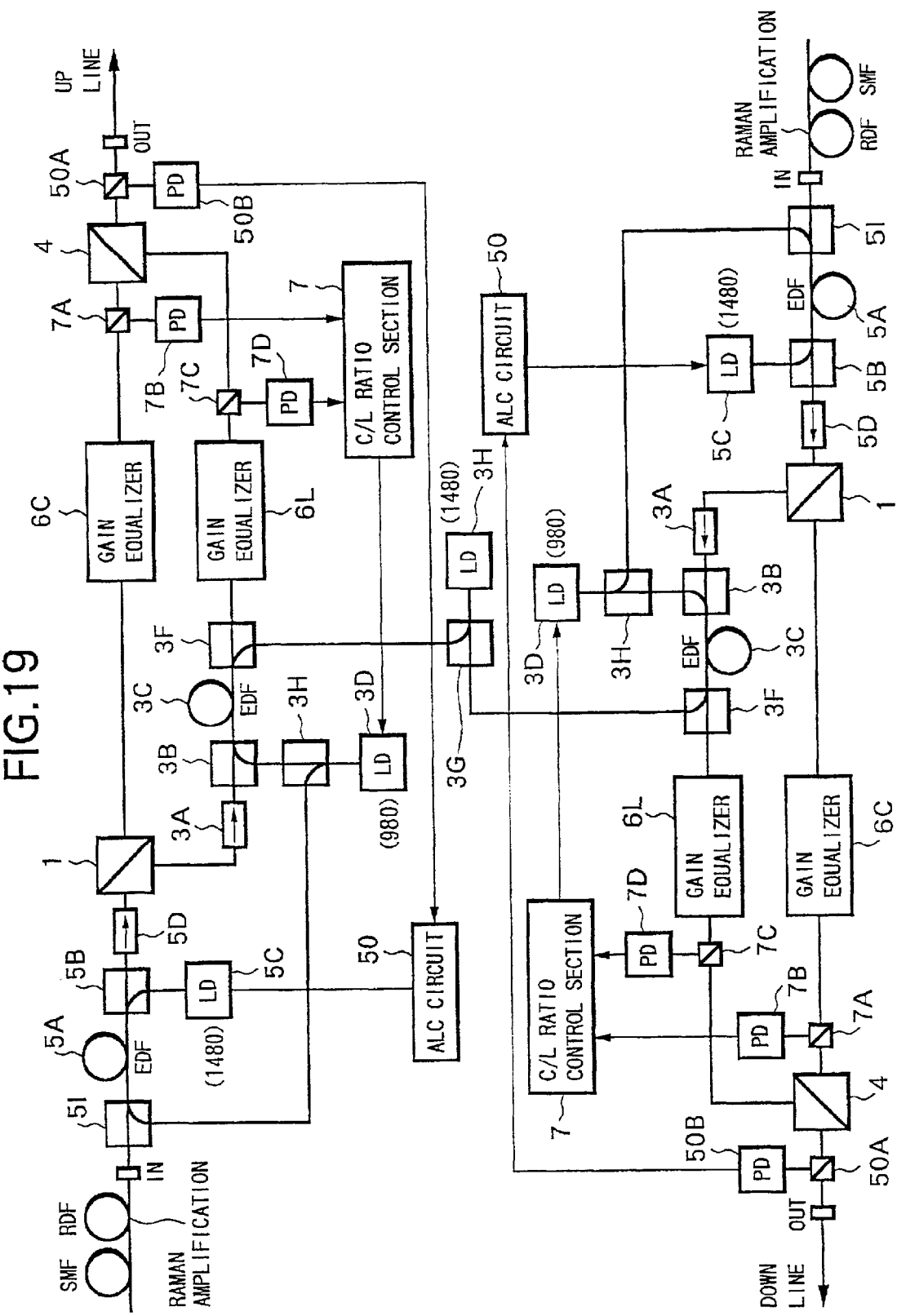
FIG. 19 is a diagram showing a specific structural example (4) of the eighth embodiment.

A structural example (4) of the optical amplifier shown in FIG. 19 is one where the structural example (2) shown in FIG. 15 and the structural example (3) shown in FIG. 17 are combined together. By having this construction, an improvement in the excitation efficiency of the L band optical amplifying section, and an improvement in noise figure of the C/L band optical amplifying section can be achieved.

Figure 20:
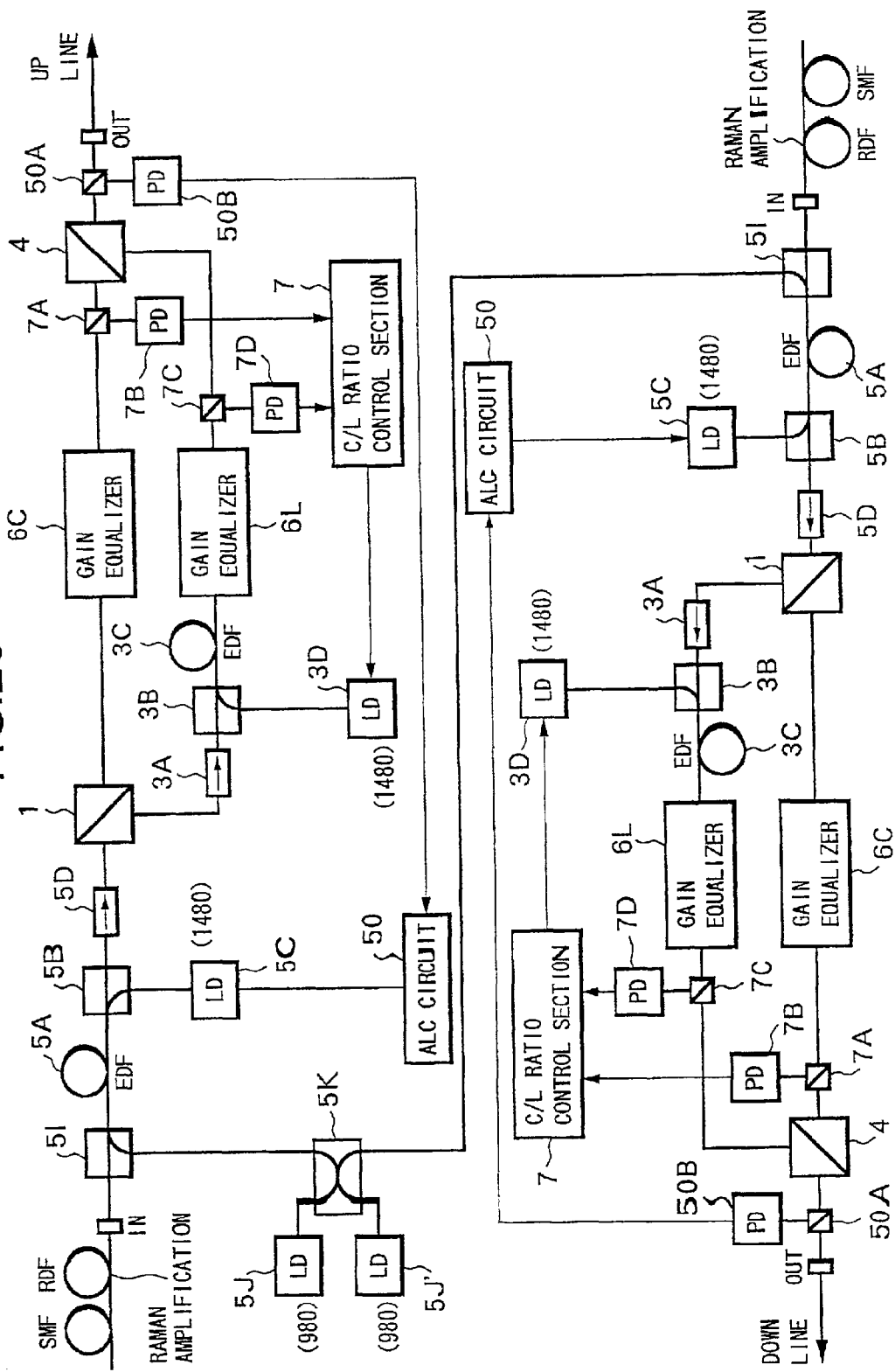
FIG. 20 is a diagram showing a specific structural example (5) of the eighth embodiment.

A structural example (5) of the optical amplifier shown in FIG. 20 is one where for example with the structural example shown in FIG. 18, the front excitation light source of the C/L band optical amplifying section is made a redundant construction. Here, the front excitation light used in the respective up and down C/L band optical amplifying sections, at the time of normal operation, is supplied from the normal excitation light source 5J of the 980 nm band via an optical coupler 5K, and in the case where an abnormality occurs in the normal excitation light source 5J, there is made a switching to a standby excitation light source 5J' of the 980 nm band.

With the above construction, since one of the excitation light sources of the C/L band optical amplifying section is made redundant in the up and down lines, a fail-safe optical amplifier construction can be realized. Other operational effects are the same as for the case of structural example (3).

Figure 21:
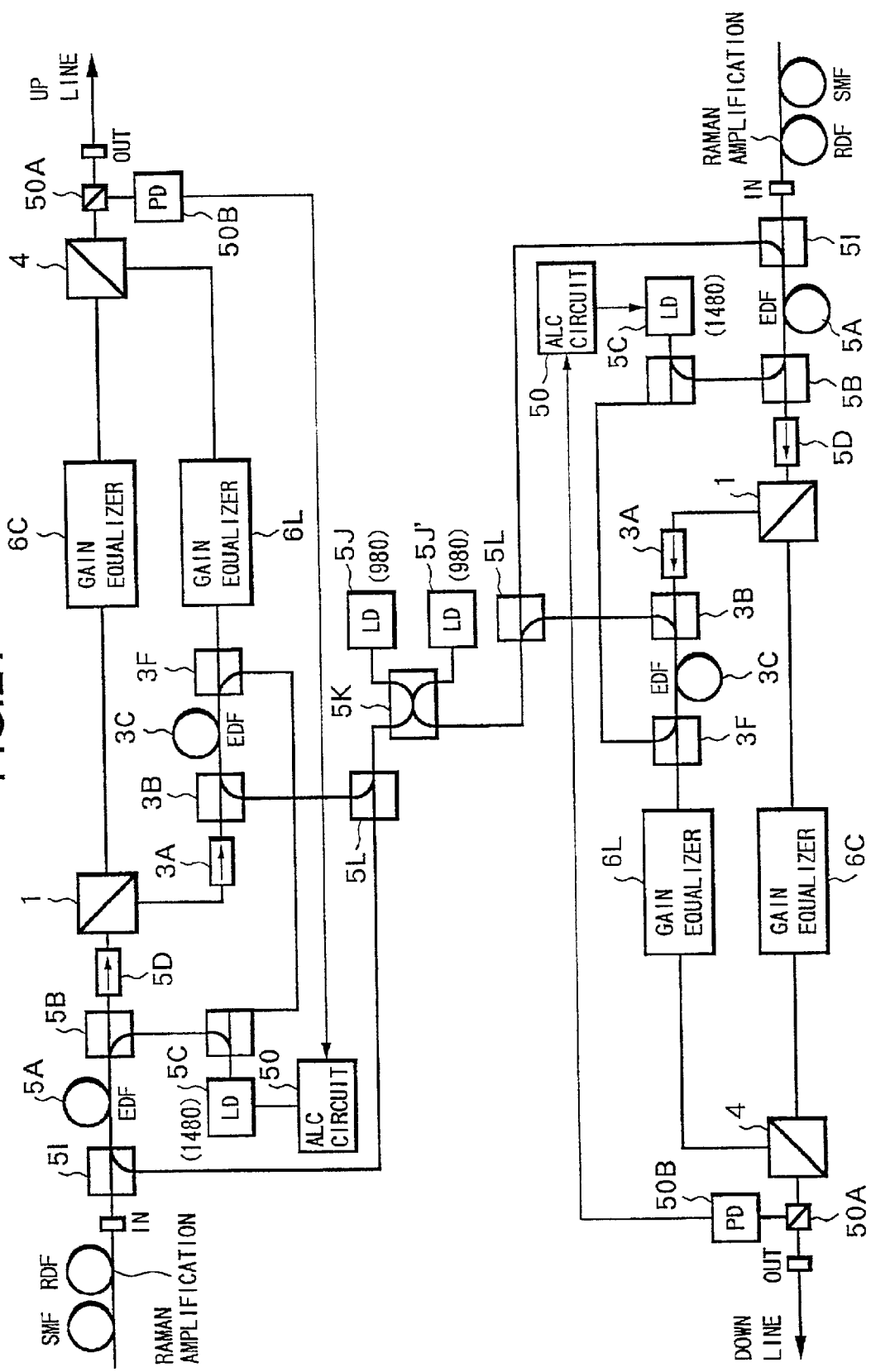
FIG. 21 is a diagram showing a specific structural example (6) of the eighth embodiment.

A structural example (6) of the optical amplifier shown in FIG. 21 is one where the structural example shown in FIG.

16 and the structural example shown in FIG. 20 are combined together, and the number of excitation light sources is thus reduced. More specifically, for each of the up and down lines, the rear excitation light source of the C/L band optical amplifying section, and the rear excitation light source of the L band optical amplifying section are used in common, and the excitation lights of the 980 nm band output from the excitation light sources 5J and 5J' of the redundant construction used in common in the up and down lines, are respectively supplied from the front side to the C/L band optical amplifying section and the L band optical amplifying section, via optical couplers 5K and 5L.

With the above described construction, with only four excitation light sources for the up and down lines, the C/L band optical amplifying section and the L band optical amplifying section can be made bidirection excitation type, respectively. Moreover, since the respective front excitation light sources are made redundant in the up and down lines, a fail-safe optical amplifier construction can be realized.

In FIG. 21, the construction for the C/L ratio control section 7 for controlling the balance of the optical power of the C band and the L band has been omitted. However depending on requirements for the balance control, the C/L ratio control section 7 may appropriately be provided.

Moreover, the above described respective structural examples (1) through (6) are examples of specific structures for the eighth embodiment However the present invention is not limited to these structural examples. Moreover, with the respective structural examples, AGC is not executed. However the construction may be such that the respective L band optical amplifying sections for the up and down lines are AGC operated. In addition, specific structural examples for embodiments other than the eighth embodiment can be easily realized based on the respective structural examples (1) through (6) etc, and hence description here is omitted.

Figure 22:
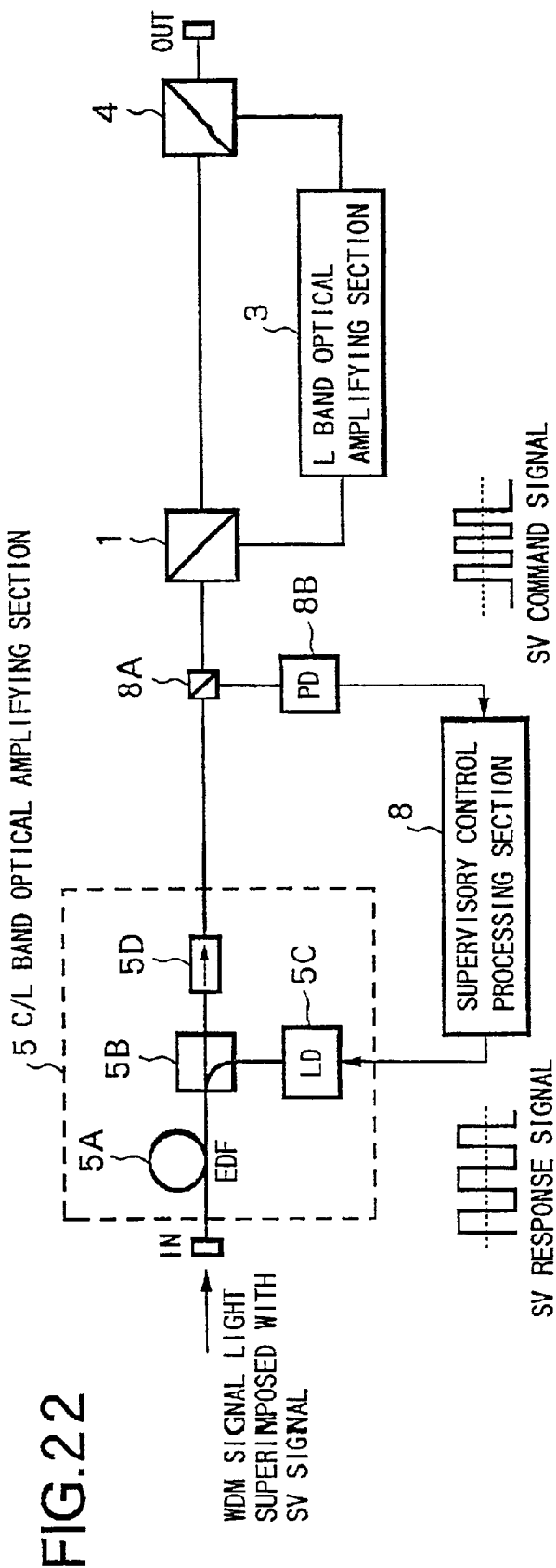
FIG. 22 is a block diagram showing a schematic construction for where a processing function for a supervisory control signal is provided in the respective embodiments of the present invention.
Figure 23:
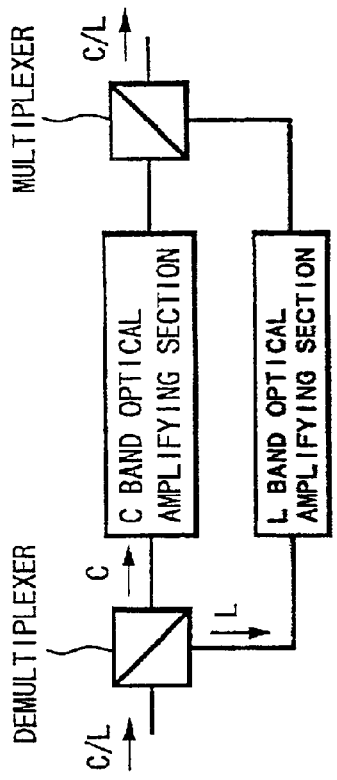
FIG. 23 is a block diagram showing a construction of a conventional C/L band optical amplifier.

Here, is a description of a construction for the case where the respective optical amplifiers shown in the first through eighth embodiments are applied to a WDM optical repeater transmission system where a supervisory control signal is transmitted from an optical transmission terminal or the like to a repeater station, FIG. 22 is a block diagram showing a schematic construction of an optical amplifier provided with a processing function for a supervisory control signal.

As shown in FIG. 22, a processing function for a supervisory control signal is realized for example by an optical coupler 8A provided between the C/L band optical amplifying section 5 and the demultiplexer 1, a photodetector (PD) 8B for converting signal lights branched by the optical coupler 8A into electrical signals, and a supervisory control processing section 8 for detecting a monitoring signal (SV command signal) sent from an optical transmission terminal side to a repeater station (optical amplifier), based on a signal from the photodetector 8B, and sending a modulation signal corresponding to a response signal (SV response signal) sent from the repeater station to an optical receiving terminal side, to the excitation light source 5C. Here the monitoring signal and the response signal are transmitted by superimposingly modulating the WDM signal light with a low frequency.

The supervisory control processing section 8 discriminates information related to the transmission condition of the WDM signal light, based on the detected monitoring signal (for example the number of the channel being used, and the number of the channels etc.) and transmits this to the respective sections inside the optical amplifier. Furthermore, this produces a modulation signal corresponding to the response signal showing discriminated information or the operating circumstances of the self-station. By modulating the excitation light source 5C according to this modulation signal, the response signal is superimposed on the WDM signal light.

In this way, by providing the optical amplifier with a function for processing supervisory control signals, optical amplification corresponding to the transmission circumstances of the WDM signal light can be performed.

We claim:

1. An optical amplifier for amplifying wavelength division multiplexed signal light which has respective optical signals of a first wavelength band of a C-band containing a plurality of optical signals with several wavelengths different from each other and a second wavelength band of a L-band containing a plurality of optical signals with several wavelengths different from the wavelengths of the optical signals contained in the first wavelength band, comprising:

a C-band optical amplifier to amplify optical signals in the C-band with excitation light;

an L-band optical amplifier to amplify optical signals in the L-band with excitation light, the L-band optical amplifier being provided in a parallel arrangement with the C-band optical amplifier; and Raman amplification unit provided in series with the C-band optical amplifier and the L-band optical amplifier, on a pre-stage side, to produce Raman amplification in the L-band, with residual excitation light output from the parallel arrangement of the C-band optical amplifier.

2. An optical amplifier according to claim 1,
wherein there is provided demultiplexing means demultiplexing said wavelength division multiplexed signal light into respective optical signals of a first wavelength band and a second wavelength band, and multiplexing means multiplexing respective optical signals of the first wavelength band and the second wavelength band which have been demultiplexed by said demultiplexing means, said optical amplifying means has a first amplifying section amplifying optical signals of the first wavelength band which have been demultiplexed by said demultiplexing means, and a second amplifying section amplifying optical signals of the second wavelength band which have been demultiplexed by said demultiplexing means, and said optical amplifying means supplying via said demultiplexing means a part of said excitation light used in said first amplifying section to said Raman amplification producing medium, so that optical signals of the second wavelength band which have been Raman amplified by said Raman amplification producing medium, are input via said demultiplexing means to said second optical amplifying section.

3. An optical amplifier according to claim 2, wherein when said first wavelength band is a 1550 nm band and said second wavelength band is a 1580 nm band, a wavelength of the excitation light used in said first optical amplifying section contains a 1480 nm band.

4. An optical amplifier according to claim 3, wherein said first optical amplifying section comprises an erbium doped fiber, at least one excitation light source generating excitation light of a 1480 nm band, and an optical coupler supplying excitation light generated by said excitation light source to said erbium doped fiber from a rear side, wherein a part of said excitation light is passed through said erbium doped fiber and said demultiplexing means and supplied to said Raman amplification producing medium.

5. An optical amplifier according to claim 1, wherein there is provided demultiplexing means demultiplexing said wavelength division multiplexed signal light into respective optical signals of a first wavelength band and a second wavelength band, and multiplexing means multiplexing respective optical signals of the first wavelength band and the second wavelength band which have been demultiplexed by said demultiplexing means, said optical amplifying means has a pre-stage amplifying section collectively amplifying said wavelength division multiplexed signal light input to said demultiplexing means, and a second optical amplifying section amplifying only optical signals of the second wavelength band which have been demultiplexed by said demultiplexing means, and said optical amplifying means supplying a part of said excitation light used in a part of said pre-stage optical amplifying section to said Raman amplification producing medium, wavelength division multiplexed signal light which contains optical signals of said second wavelength band which have been Raman amplified by said Raman amplification producing medium are input to said pre-stage optical amplifying section.

6. An optical amplifier according to claim 5, wherein when said first wavelength band is a 1550 nm band and said second wavelength band is a 1580 nm band, a wavelength of the excitation light used in said pre-stage optical amplifying section contains a 1480 nm band.

7. An optical amplifier according to claim 6, wherein said pre-stage optical amplifying section comprises an erbium doped fiber, at least one excitation light source generating excitation light of a 1480 nm band, and an optical coupler supplying excitation light generated by said excitation light source to said erbium doped fiber from a rear side, wherein a part of said excitation light is passed through said erbium doped fiber and supplied to said Raman amplification producing medium.

8. An optical amplifier according to claim 1, wherein said Raman amplification producing medium is an optical fiber which is designed so that a non-linear effective cross section is small compared to a 1.3 µm zero dispersion single mode fiber.

9. An optical amplifier according to claim 1, wherein said external transmission path is of a hybrid transmission path formed by connecting a positive dispersion fiber having a positive wavelength dispersion value and a positive dispersion slope with respect to a signal light wavelength band, and a negative dispersion fiber having a negative wavelength dispersion value and a negative dispersion slope with respect to the signal light wavelength band, wherein one end on the side of said negative dispersion fiber is arranged at an input side of said optical amplifying means and functions as said Raman amplification producing medium.

10. An optical amplifier according to claim 1, wherein there is provided optical power constant control means monitoring an output power of said wavelength division multiplexed signal light, and controlling an excitation light driving condition of said optical amplifying means so that said output power becomes constant.

11. An optical amplifier according to claim 1, wherein there is provided gain constant control means monitoring a gain in said optical amplifying means, and controlling an excitation light driving condition of said optical amplifying means so that said gain becomes constant.

12. An optical amplifier according to claim 1, wherein there is provided supervisory control means processing a supervisory control signal transmitted together with said wavelength division multiplexed signal light.

13. An optical amplifier according to claim 5 comprising:
first power monitor means monitoring the optical signal power of the first wavelength band which has been demultiplexed by said demultiplexing means;
second power monitor means monitoring the optical signal power of the second wavelength band which has been amplified by said second optical amplifying section; and
optical power deviation control means controlling the operation of at least one of said pre-stage optical amplifying section and said second optical amplifying section in response to the respective monitor results of the first and second power monitor means, so that the optical power deviation for the first and the second wavelength bands becomes constant.

14. An optical amplifier for amplifying wavelength division multiplexed signal light which has respective optical signals of a first wavelength band of a C-band containing a plurality of optical signals with several wavelengths different from each other and a second wavelength band of an L-band containing a plurality of optical signals with several wavelengths different from the wavelengths of the optical signals contained in the first wavelength band, comprising:
a C-band optical amplifier to amplify optical signals in the C-band with excitation light;
an L-band optical amplifier to amplify optical signals in the L-band with excitation light, the L-band optical amplifier being provided in a parallel arrangement with the C-band optical amplifier; and
a Raman amplification unit provided in series with the C-band optical amplifier and the L-band optical amplifier, at a post-stage side, to produce Raman amplification, in the L-band, with residual excitation light from the parallel arrangement of the C-band optical amplifier.

15. An optical amplifier according to claim 14,
wherein there is provided a demultiplexing unit demultiplexing said wavelength division multiplexed signal light into respective optical signals of a first wavelength band and a second wavelength band, and a multiplexing unit multiplexing respective optical signals of the first wavelength band and the second wavelength band which have been demultiplexed by said demultiplexing unit,
said optical amplifying unit has a first amplifying section amplifying optical signals of the first wavelength band which have been demultiplexed by said demultiplexing unit, and a second amplifying section amplifying optical signals of the second wavelength band which have been demultiplexed by said demultiplexing unit, and
said optical amplifying unit supplying via said demultiplexing unit a part of said excitation light used in said first amplifying section to said Raman amplification producing medium, so that optical signals of the second wavelength band which have been Raman amplified by said Raman amplification producing medium, are input via said demultiplexing unit to said second optical amplifying section.

16. An optical amplifier according to claim 15, wherein when said first wavelength band is a 1550 nm band and said second wavelength band is a 1580 nm band, a wavelength of the excitation light used in said first optical amplifying section contains a 1480 nm band.

17. An optical amplifier according to claim 16, wherein said first optical amplifying section comprises an erbium doped fiber, at least one excitation light source generating excitation light of a 1480 nm band, and an optical coupler supplying excitation light generated by said excitation light source to said erbium doped fiber from a rear side, wherein a part of said excitation light is passed through said erbium doped fiber and said demultiplexing unit and supplied to said Raman amplification producing medium.

18. An optical amplifier according to claim 14, wherein there is provided a demultiplexing unit demultiplexing said wavelength division multiplexed signal light into respective optical signals of a first wavelength band and a second wavelength band, and a multiplexing unit multiplexing respective optical signals of the first wavelength band and the second wavelength band which have been demultiplexed by said demultiplexing unit, said optical amplifying unit has a pre-stage amplifying section collectively amplifying said wavelength division multiplexed signal light input to said demultiplexing unit, and a second optical amplifying section amplifying only optical signals of the second wavelength band which have been demultiplexed by said demultiplexing unit, and said optical amplifying unit supplying a part of said excitation light used in a part of said pre-stage optical amplifying section to said Raman amplification producing medium, wavelength division multiplexed signal light which contains optical signals of said second wavelength band which have been Raman amplified by said Raman amplification producing medium are input to said pre-stage optical amplifying section.

19. An optical amplifier according to claim 18, wherein when said first wavelength band is a 1550 nm band and said second wavelength band is a 1580 nm band, a wavelength of the excitation light used in said pre-stage optical amplifying section contains a 1480 nm band.

20. An optical amplifier according to claim 19, wherein said pre-stage optical amplifying section comprises:

an erbium doped fiber;

at least one excitation light source generating excitation light of a 1480 nm band; and an optical coupler supplying excitation light generated by said excitation light source to said erbium doped fiber from a rear side, wherein a part of said excitation light is passed through said erbium doped fiber and supplied to said Raman amplification producing medium.

21. An optical amplifier according to claim 14, wherein said Raman amplification producing medium is an optical fiber which is designed so that a non-linear effective cross section is small compared to a 1.3 μm zero dispersion single mode fiber.

22. An optical amplifier according to claim 14, wherein said external transmission path is of a hybrid transmission path formed by connecting a positive dispersion fiber having a positive wavelength dispersion value and a positive dispersion slope with respect to a signal light wavelength band, and a negative dispersion fiber having a negative wavelength dispersion value and a negative dispersion slope with respect to the signal light wavelength band, wherein one end on the side of said negative dispersion fiber is arranged at an input side of said optical amplifying unit and functions as said Raman amplification producing medium.

23. An optical amplifier according to claim 14, wherein there is provided an optical power constant control unit monitoring an output power of said wavelength division multiplexed signal light, and controlling an excitation light driving condition of said optical amplifying unit so that said output power becomes constant.

24. An optical amplifier according to claim 14, wherein there is provided a gain constant control unit monitoring a gain in said optical amplifying unit, and controlling an excitation light driving condition of said optical amplifying unit so that said gain becomes constant.

25. An optical amplifier according to claim 14, wherein there is provided a supervisory control unit processing a supervisory control signal transmitted together with said wavelength division multiplexed signal light.

26. An optical amplifier according to claim 18, further comprising:

a first power monitor unit monitoring the optical signal power of the first wavelength band which has been demultiplexed by said demultiplexing unit;

a second power monitor unit monitoring the optical signal power of the second wavelength band which has been amplified by said second optical amplifying section; and an optical power deviation control unit controlling the operation of at least one of said pre-stage optical amplifying section and said second optical amplifying section in response to the respective monitor results of the first and second power monitor unit, so that the optical power deviation for the first and the second wavelength bands becomes constant.

27. An optical amplifier, comprising:

a C-band optical amplifier to amplify C-band optical signals of wavelength division multiplexed signal light, the C-band optical signals being amplified with excitation light, the C-band optical amplifier outputting residual excitation light;

L-band optical amplifier in parallel with the C-band optical amplifier, to amplify L-band optical signals of the wavelength division multiplexed light, the L-band optical signals being amplified with excitation light;

a C/L ratio control section, controlling a balance between the amplified C-band optical signals and the amplified L-band optical signals; and a Raman amplification unit provided in series with the C-band optical amplifier and the L-band optical amplifier, to produce Raman amplification for the optical signals in the L-band with the residual excitation light.

28. An optical amplifier receiving optical signals of a first wavelength band of a C-band and a second separate wavelength band of an L-band, wherein each wavelength band contains a plurality of optical signals of different wavelengths, said amplifier comprising:

a band demultiplexer providing a C-band optical signal output and L-band optical signal output;

a first amplifying unit amplifying the C-band optical signal output using a rare earth element doped fiber to which excitation light is supplied;

a second amplifying unit, arranged in parallel with the first amplifying unit, amplifying the L-band optical signal output;

a band multiplexer multiplexing respective optical signals of the C-band and the L-band which have been demultiplexed by said band demultiplexer;

a Raman amplifying unit provided in series with the first amplifying unit and the second amplifying unit, on a pre-stage side, to produce Raman amplification for the optical signals in the L-band with residual excitation light output from the first amplifying unit via the band demultiplexer; and a C/L ratio control section, controlling a balance between a C-band optical signal power and an L-band optical signal power.

29. An optical amplifying system receiving optical signals of a first wavelength band of a C-band and a second separate wavelength band of an L-band, wherein each wavelength band contains a plurality of optical signals of different wavelengths, said system comprising:

a first optical amplifier selectively amplifying the optical signals of the first wavelength band;

a second optical amplifier, arranged in parallel with the first optical amplifier, selectively amplifying the optical signals of the second wavelength band;

a Raman amplifier provided in series with the first optical amplifier and the second optical amplifier, on a pre-stage side, to produce Raman amplification for the optical signals in the L-band with residual excitation light output from the first amplifier; and a C/L ratio control section, controlling a balance between first the power of amplified C-band optical signals and L-band optical signals.

30. An optical amplifier comprising:

a multi-band amplification section having first and second sides, comprising:

a C-band optical amplifier to amplify optical signals in a C-band with excitation light; and an L-band optical amplifier to amplify optical signals in an L-band with excitation light, the L-band optical amplifier being provided in parallel with the C-band optical amplifier, the multi-band amplification section outputting residual excitation light from at least the first side thereof; and a Raman amplification unit provided in series with the multi-band amplification section, at the first side of the multi-band amplification section, to produce Raman amplification for the optical signals in the L-band with the residual excitation light output from the multi-band amplification section.

31. An optical amplifier system for amplifying a wavelength division multiplexed signal light which contains respective optical signals of a first wavelength band and a second wavelength band, comprising:

a demultiplexer for demultiplexing the wavelength division multiplexed signal light into said first wavelength band and said second wavelength band;

a plurality of optical amplifiers for amplifying said first wavelength band and said second wavelength band from the demultiplexer using a rare earth element doped fiber to which excitation light is supplied;

wherein excitation light passes through one of the optical amplifiers, amplifying the first wavelength band, and the demultiplexer to provide Raman amplification, to the second wavelength band, on a pre-stage side of the demultiplexer.

* * * * *

UNITED STATES PATENT AND TRADEMARK OFFICE
CERTIFICATE OF CORRECTION

PATENT NO. : 6,882,466 B1
DATED : April 19, 2005
INVENTOR(S) : Naomasa Shimojoh et al.

It is certified that error appears in the above-identified patent and that said Letters Patent is hereby corrected as shown below:

Title page,
Item [56], References Cited, OTHER PUBLICATIONS,
"Kinoshita" reference, after "Communications" insert -- and 4th Optoelectronics and Communication Conference --; and delete "and Optoelectronics and Communications Conference,".

Column 20,
Line 26, before "Raman" insert -- a --.

Column 24,
Line 35, before "L-Band", insert -- an --.

Column 25,
Line 23, delete "first".

Signed and Sealed this

Third Day of January, 2006

JON W. DUDAS
*Director of the United States Patent and Trademark Office*